United States Patent [19]

Imai et al.

[11] 4,312,038

[45] Jan. 19, 1982

[54] ELECTRONIC ENGINE CONTROL APPARATUS HAVING ARRANGEMENT FOR DETECTING STOPPING OF THE ENGINE

[75] Inventors: Masumi Imai; Masao Takato, both of Hitachi; Toshio Furuhashi, Mito, all of Japan

[73] Assignee: Hitachi, Ltd., Tokyo, Japan

[21] Appl. No.: 952,531

[22] Filed: Oct. 18, 1978

[30] Foreign Application Priority Data

Oct. 19, 1977 [JP] Japan ............................ 52-125973

[51] Int. Cl.[3] ........................ F02D 5/00; F02P 5/08; F02P 11/06; G05B 15/02

[52] U.S. Cl. ............................ 364/431.12; 123/486; 123/491; 123/493; 364/431.09

[58] Field of Search ...................... 364/424, 431, 442; 123/440, 480, 486, 491, 492, 493; 371/62

[56] References Cited

U.S. PATENT DOCUMENTS

| | | | |
|---|---|---|---|
| 3,816,717 | 6/1974 | Yoshida et al. | 364/431 |
| 3,893,432 | 7/1975 | Krupp et al. | 123/486 |
| 3,919,533 | 11/1975 | Einolf, Jr. et al. | 371/62 |
| 3,969,614 | 7/1976 | Moyer et al. | 364/431 |
| 4,094,274 | 6/1978 | Harada et al. | 123/493 X |
| 4,099,495 | 7/1978 | Kiencke et al. | 364/442 |
| 4,100,891 | 7/1978 | Williams | 123/491 X |
| 4,119,070 | 10/1978 | Asano | 123/440 |
| 4,148,283 | 4/1979 | Harada et al. | 123/491 |
| 4,255,789 | 3/1981 | Hartford et al. | 364/431 |

*Primary Examiner*—Felix D. Gruber
*Attorney, Agent, or Firm*—Craig and Antonelli

[57] ABSTRACT

An electronic engine control apparatus controls the engine on a basis of the outputs of the digital processor which arithmetically processes output signals from plural sensors for detecting the operating conditions of the engine. Whether or not a pulse to be generated in timing with the rotation of the engine has been generated within a preset period of time, as specified by the digital processor, is checked. If the pulse is generated, a timer for measuring the preset period is cleared. If the pulse is not generated within the preset period, a signal indicating the stopping of the engine is generated, whereby an interrupt signal is generated to cause the digital processor to process the interrupt.

49 Claims, 27 Drawing Figures

ELECTRONIC ENGINE CONTROL APPARATUS HAVING ARRANGEMENT FOR DETECTING STOPPING OF THE ENGINE

CROSS REFERENCE TO RELATED APPLICATIONS

The present application relates to subject matter disclosed in the following applications:

U.S. Ser. No. 943,930 Filed: Sept. 20, 1978 Hiroastu Tokuda et al.

U.S. Ser. No. 951,509 Filed: Oct. 16, 1978 Shigeki Morinaga et al.

U.S. Ser. No. 952,275 Filed: Oct. 18, 1978 Masao Takato et al.

U.S. Ser. No. 952,276 Filed: Oct. 18, 1978 Hiroastu Tokuda et al.

U.S. Ser. No. 952,279 Filed: Oct. 18, 1978 Hiroastu Tokuda et al.

U.S. Ser. No. 952,326 Filed: Oct. 18, 1978 Masumi Imai et al.

U.S. Ser. No. 952,532 Filed: Oct. 18, 1978 Hiroastu Tokuda et al.

U.S. Ser. No. 952,533 Filed: Oct. 18, 1978 Masumi Imai et al.

U.S. Ser. No. 011,845 Filed: Feb. 13, 1979 Toshio Furuhashi et al.

U.S. Ser. No. 059,029 Filed: July 19, 1979 Sanshiro Obara et al.

U.S. Ser. No. 060,751 Filed: July 26, 1979 Toshio Furuhashi et al.

U.S. Ser. No. 064,431 Filed: Aug. 7, 1979 Toshio Furuhashi.

U.S. Ser. No. 073,085 Filed: Sept. 6, 1979 Masumi Imai et al.

This invention relates to an apparatus for controlling an internal combustion engine mounted especially on an automobile.

With the continuing demand for automobiles as means of transportation, there have arisen several problems. Among them are air pollution and the excessive consumption of petroleum.

Some measures have been taken to reduce the amount of harmful substances in exhaust gases, but this also caused a degradation of the overall efficiency of the internal combustion engine (hereafter referred to simply as engine). For preventing the degradation of the operating efficiency of the engine and improving measures against exhaust gases, an electronic control apparatus has been employed which enjoys improved control precision. For example, there have been proposed an electronically controlled fuel injection apparatus and an electronically controlled ignition timing apparatus and most recently an ignition apparatus controlled by a microprocessor.

The conventional trend in such a control apparatus is toward the mere replacement of mechanical control by an electric one and, therefore, the individual controlled objects must be provided with associated separate electronic control units.

To suppress the harmful components in exhaust gases and to operate the engine with a high efficiency, a systematic control of an engine is required. Accordingly, it is necessary to detect the condition that the engine is stopping, as immediately as possible and to perform corresponding processing operations swiftly.

An object of this invention is to provide an apparatus for controlling the engine of an automobile, capable of rapidly detecting the condition that the engine has stopped.

The engine control apparatus according to this invention has a timer counter the contents of which are incremented at regular intervals, a means for generating pulses in synchronization with rotation of the engine crankshaft and a means for resetting the timer counter in response to the pulses. According to this apparatus, a pulse is generated which indicates the stopping of the engine, when the timer counter counts up to a predetermined value without being reset so that the stop of the engine is rapidly detected.

Further, according to the control apparatus embodying this invention, unless the signal to be generated in synchronization with the rotation of the engine crankshaft is delivered within a preset period of time, an interrupt signal for the processor is generated and the operation of the circuit for controlling the engine is temporarily stopped, whereby after the conditions of the control circuit and the processor have been reset at initial ones, assumed before the starting of the engine, the operation of controlling the engine is resumed.

The above and other objects, features and advantages of the present invention will be more clear from the following description with reference to the accompanying drawings, in which:

FIG. 1 shows an arrangement plan of sensors and actuators in an embodiment of an electronic engine control apparatus;

FIG. 2, including A–G, is a diagram for explaining the operation of the circuits shown in FIG. 1;

Figure 4:
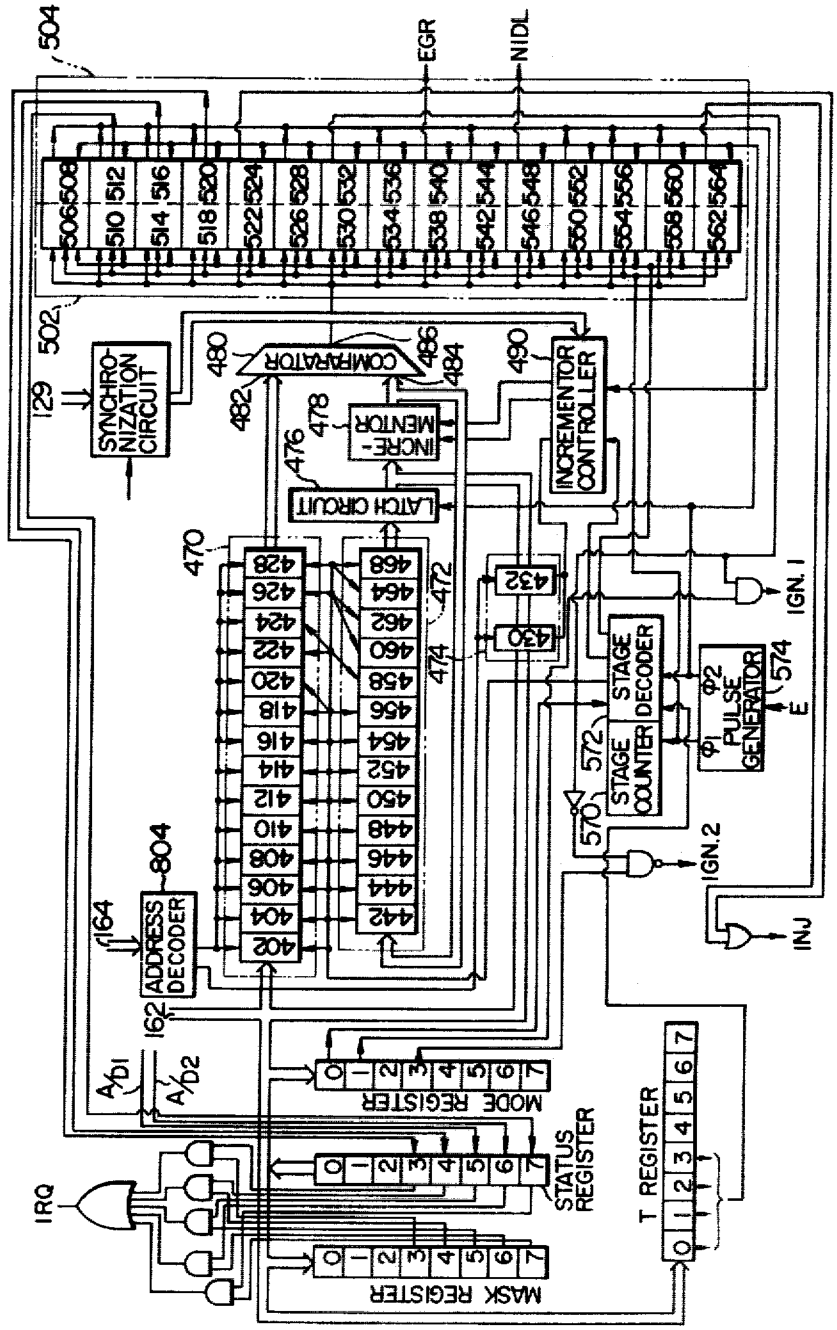
FIG. 4 shows a partial detail of the input/output circuit shown in FIG. 3.
Figure 5:
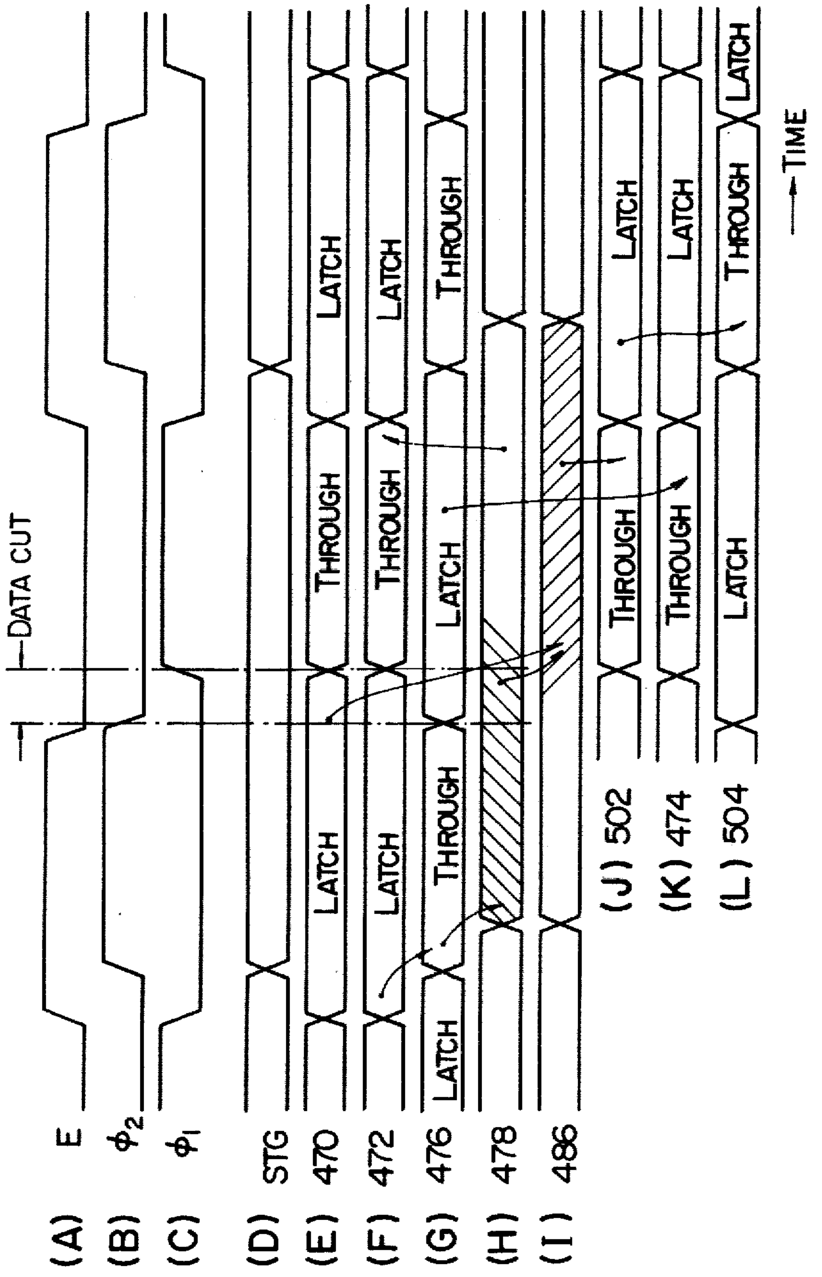
Figure 6:
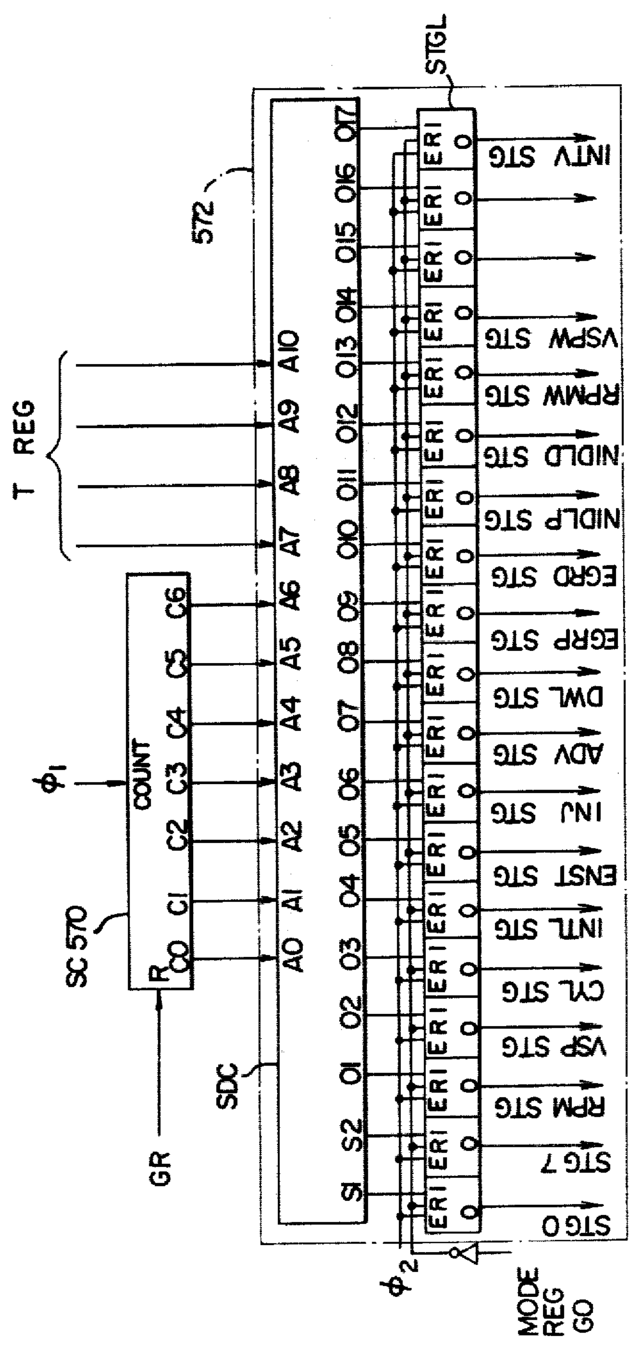
Figure 7:
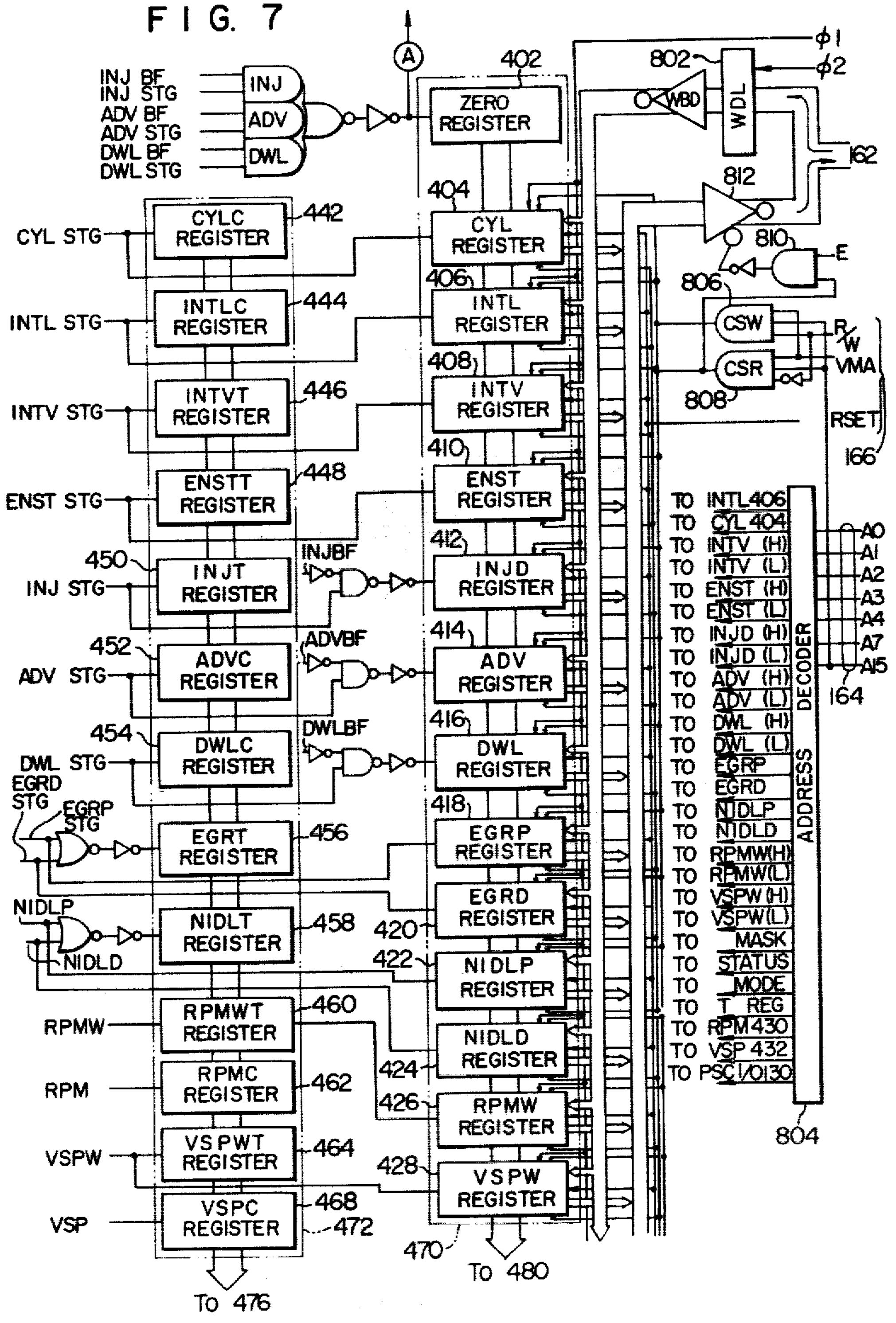
Figure 8:
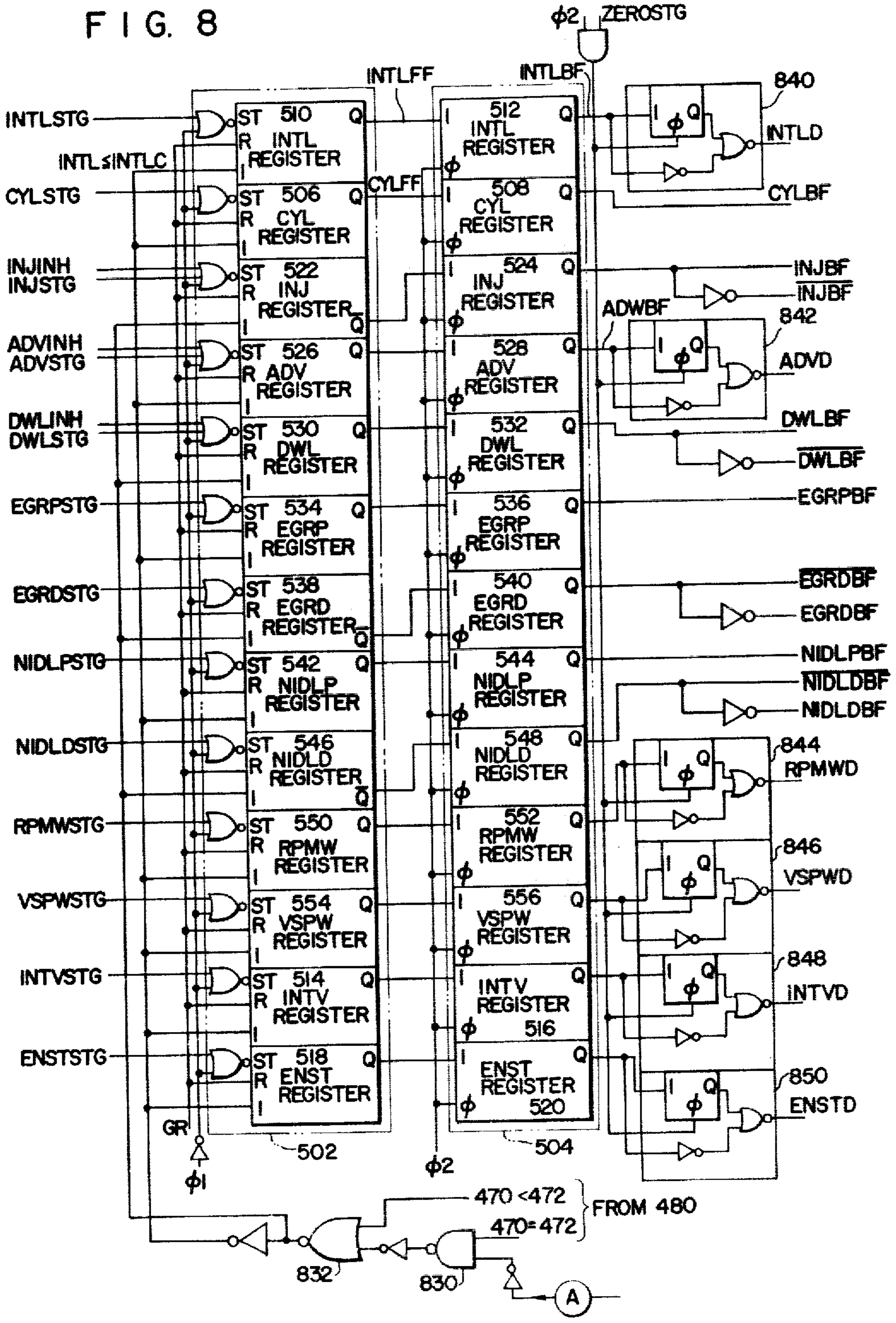
Figure 9:
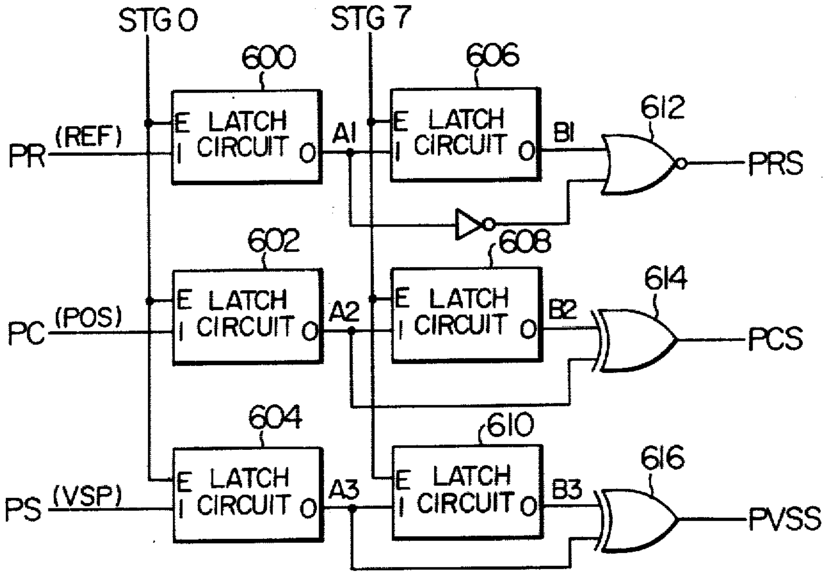
Figure 10:
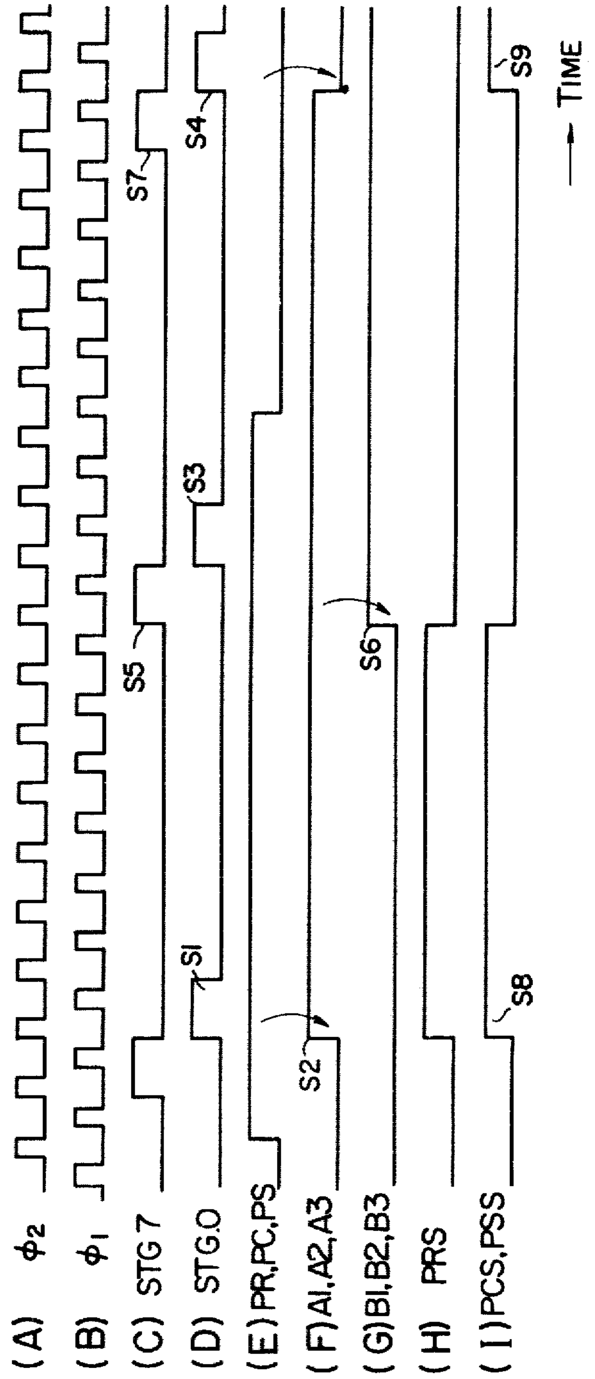
Figure 11:
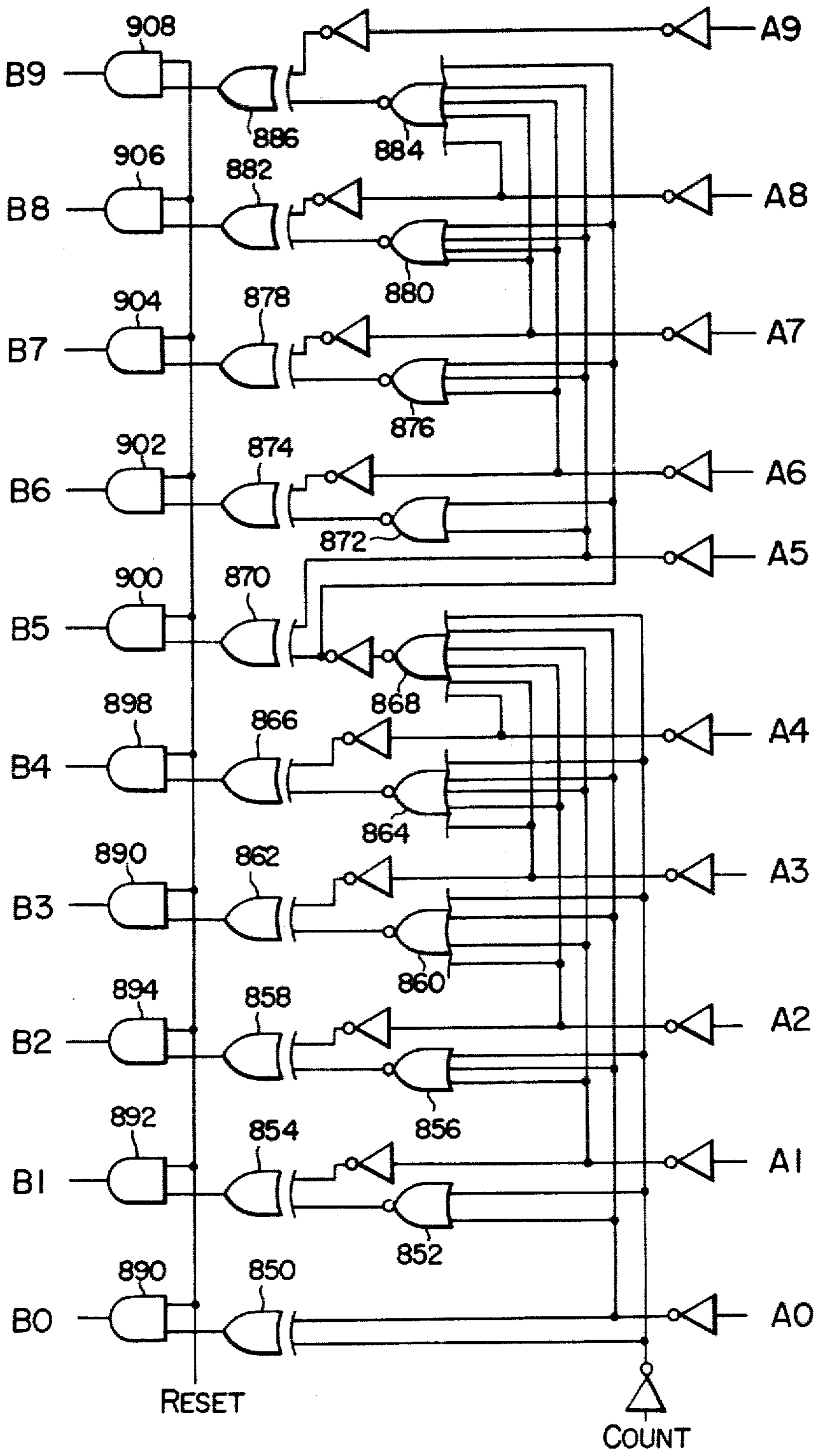
Figure 12A:
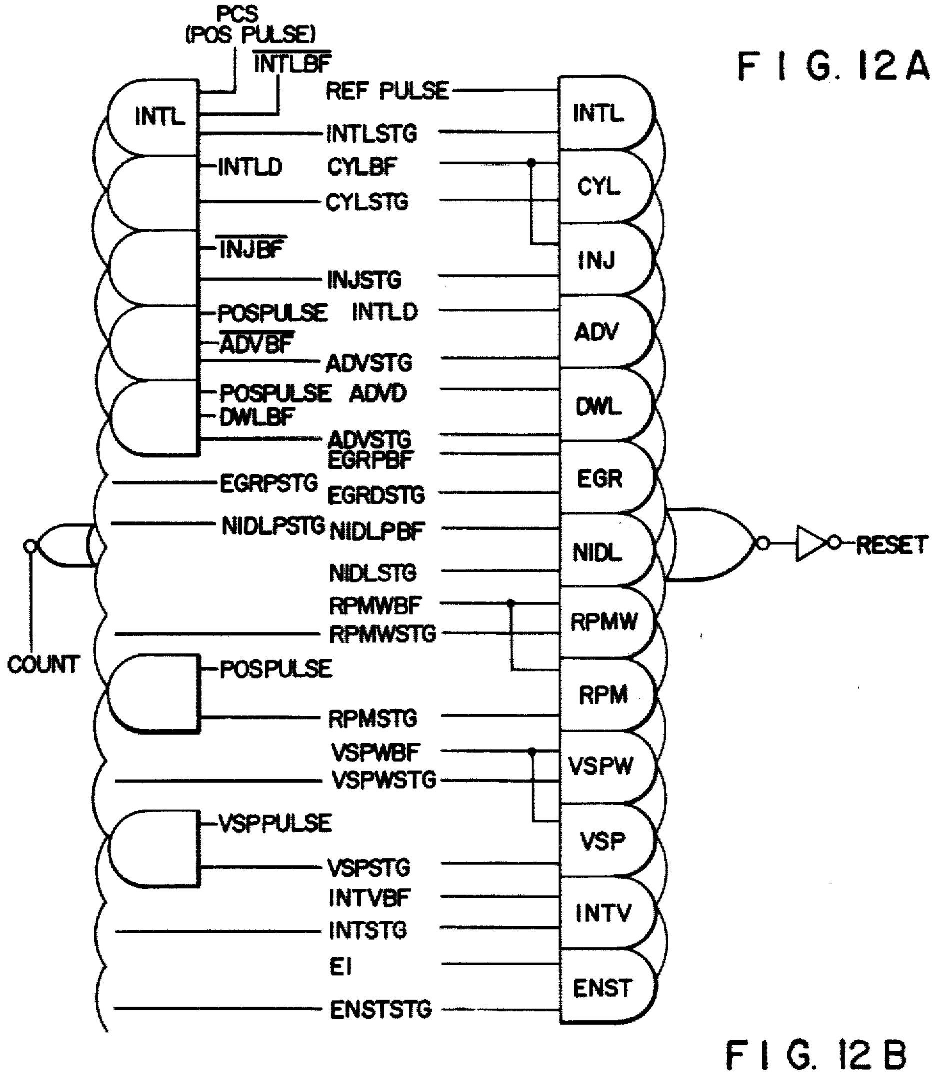
Figure 12B:
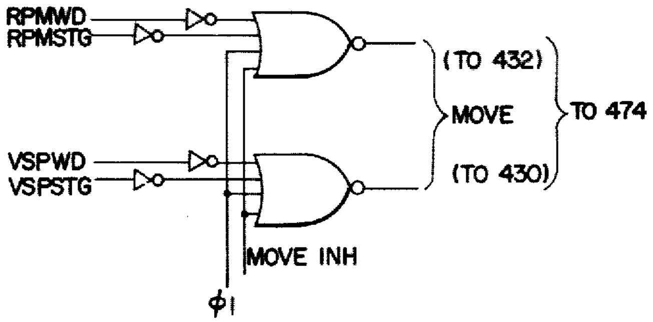
Figure 13:
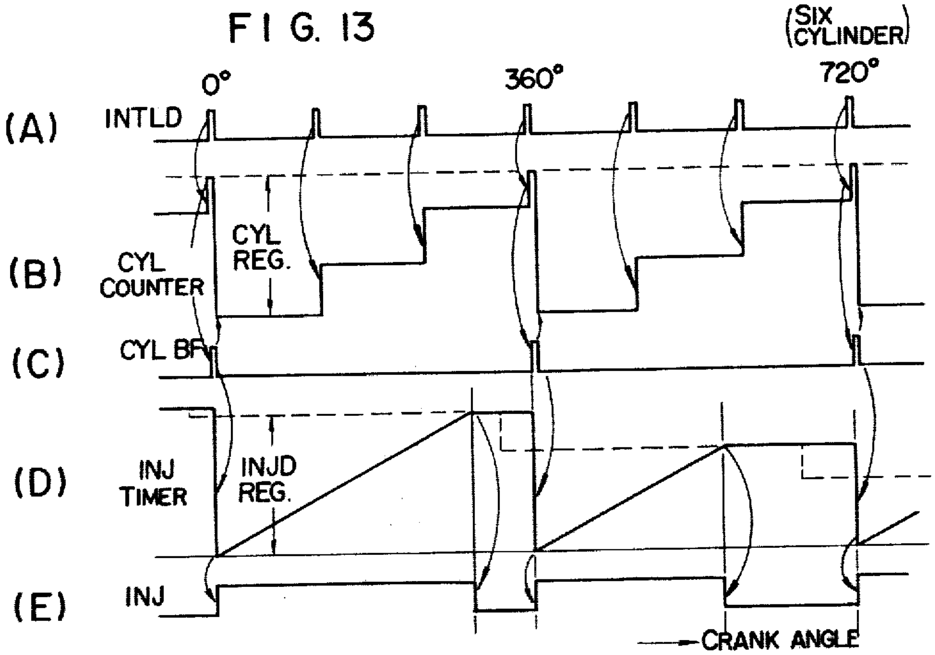
Figure 14:
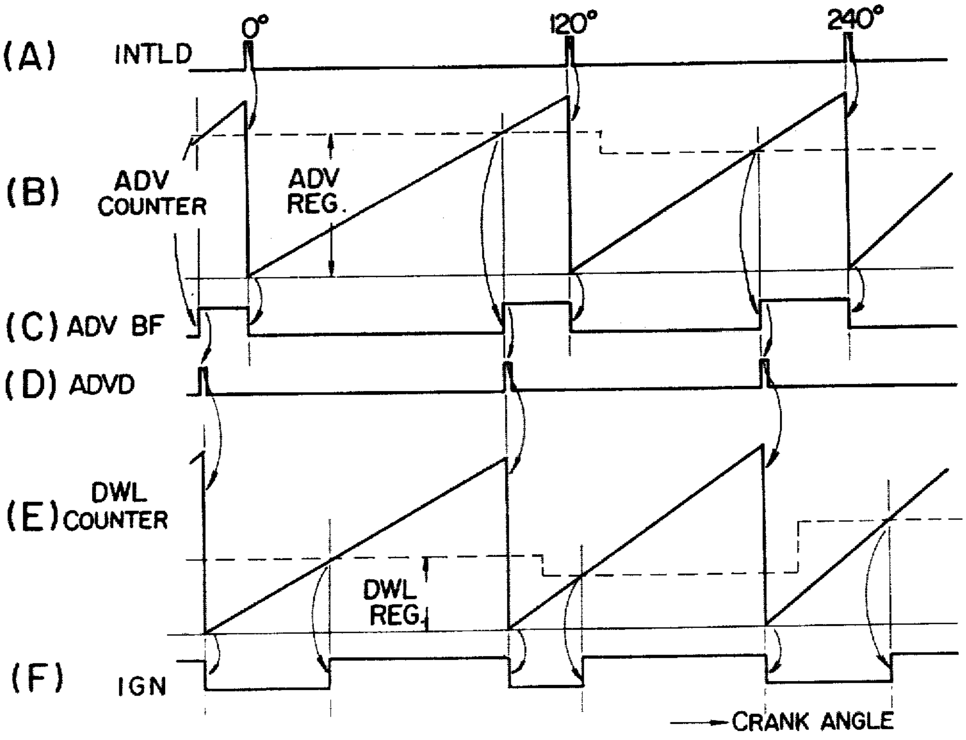
Figure 15:
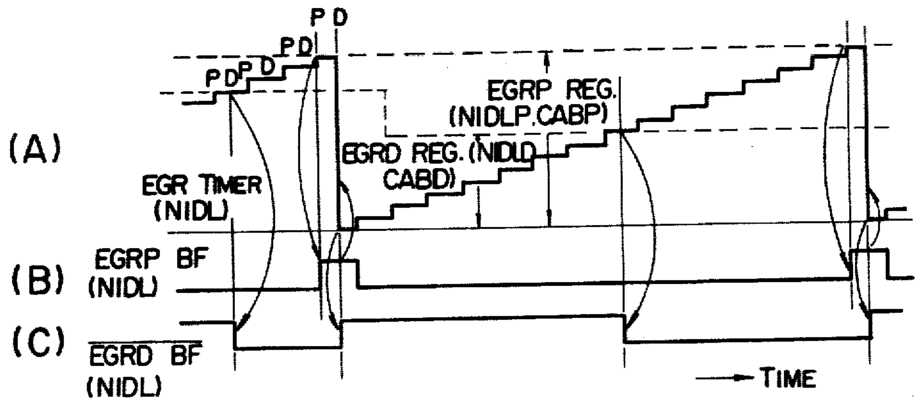
Figure 16:
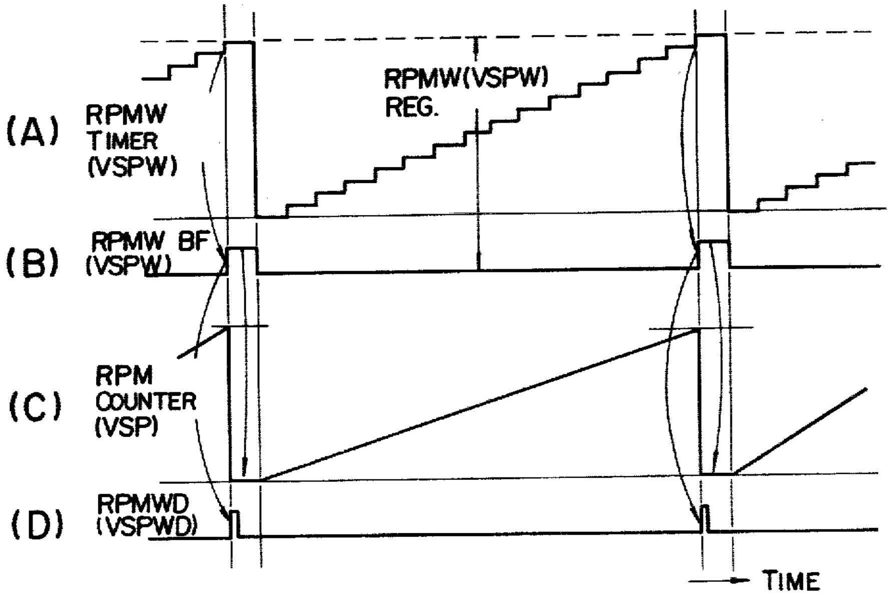
Figure 17:
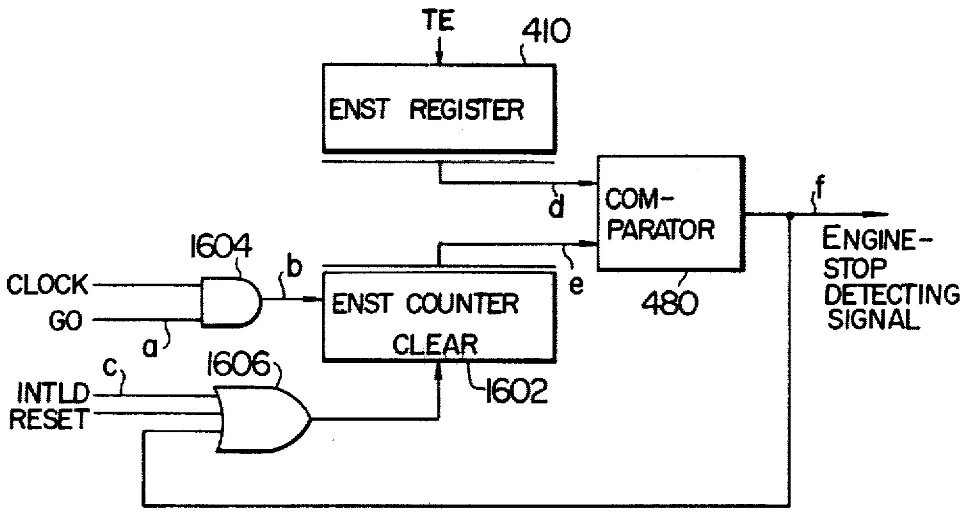
Figure 18:
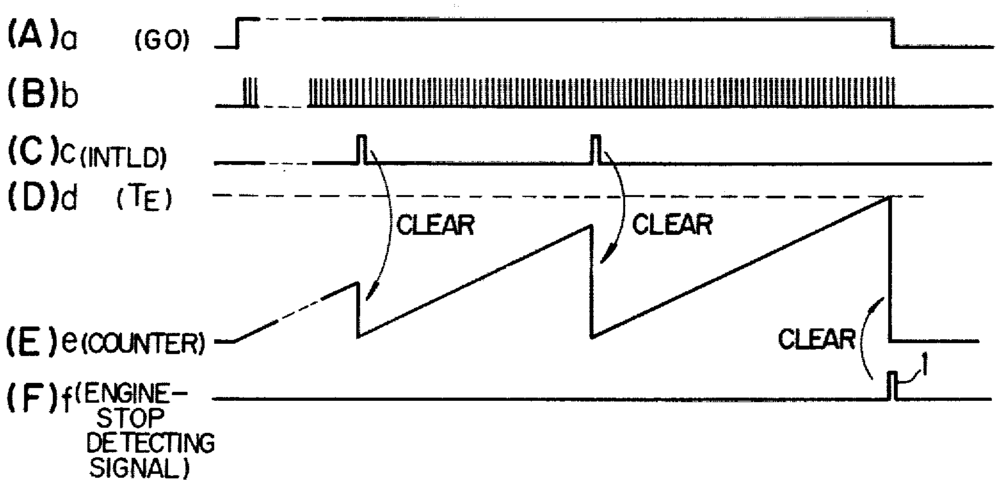
Figure 19:
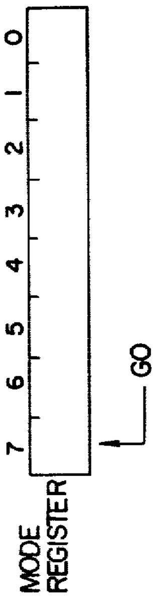
Figure 20:
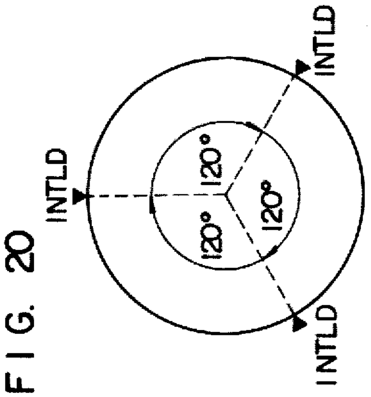
Figure 21:
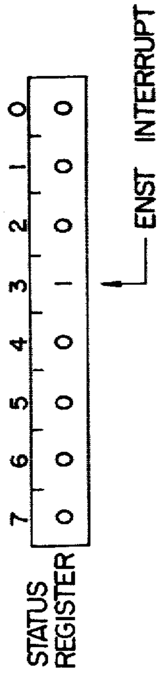
Figure 22:
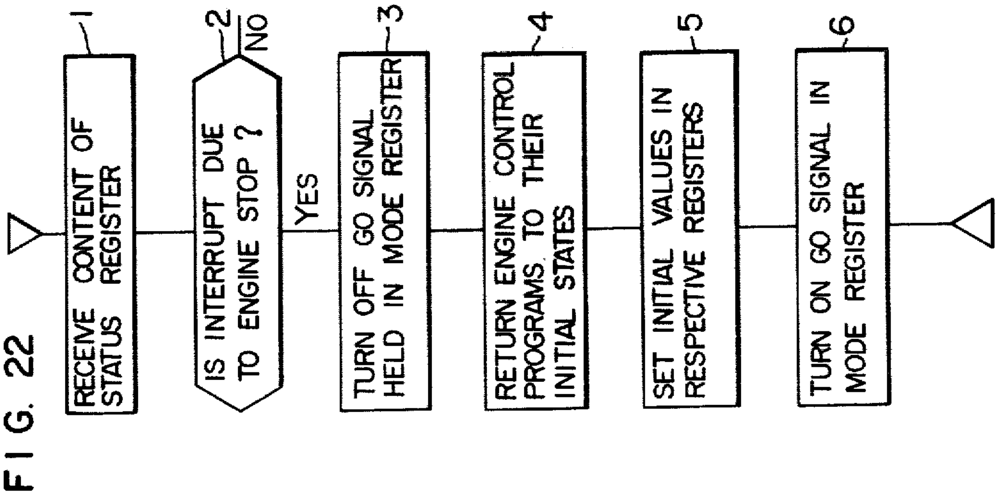
Figure 23:
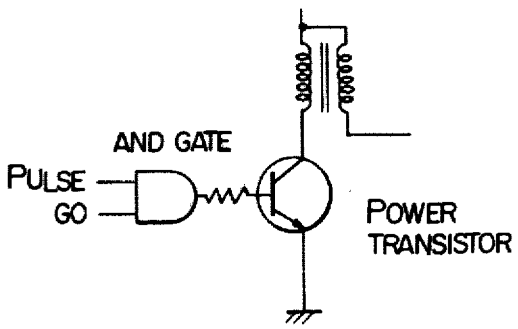
Figure 24:
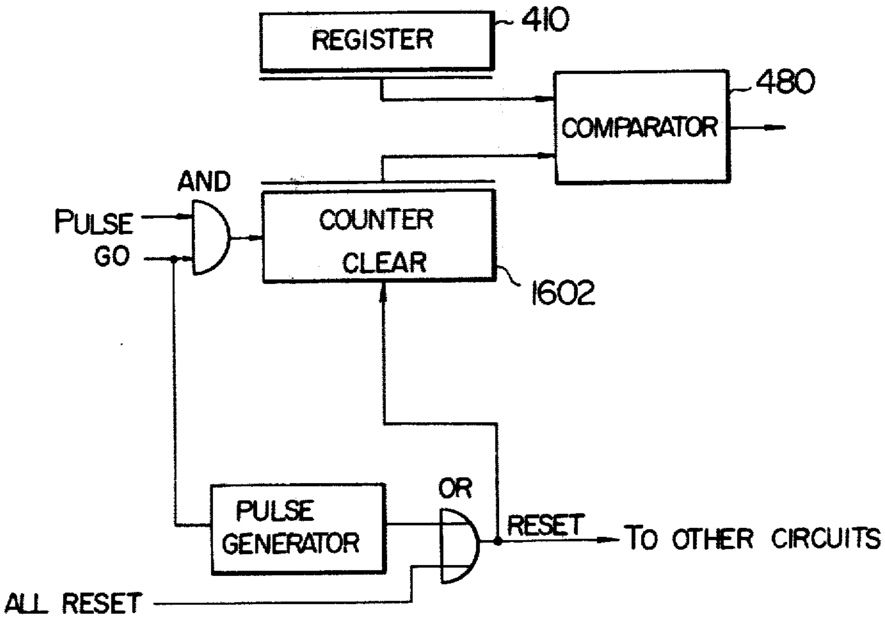
Figure 25:
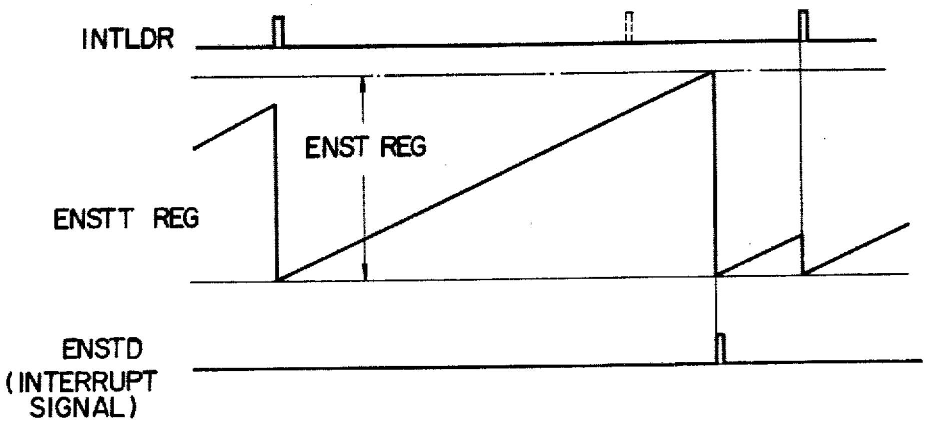
Figure 26:
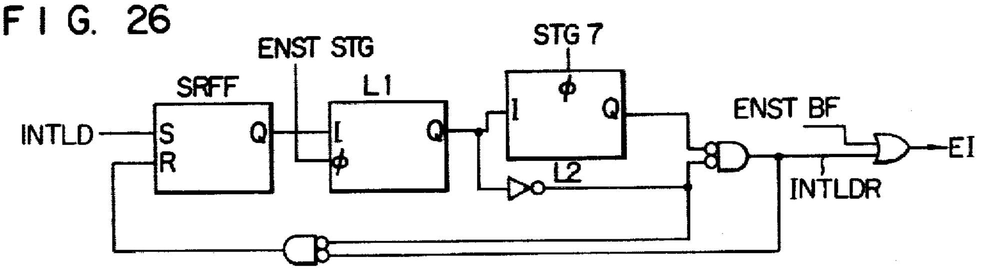
Figure 27:
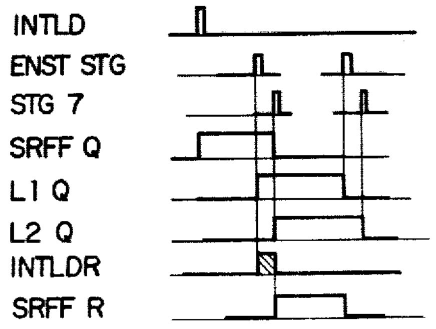

FIG. 5, including A–I, is a diagram for explaining the operation of the circuit shown in FIG. 4;

FIG. 6 shows the detail of the stage counter shown in FIG. 4;

FIG. 7 shows in detail concrete examples of the reference and the instantaneous register groups shown in FIG. 4;

FIG. 8 shows in detail concrete examples of the first and the second comparison output register groups 502 and 504;

FIG. 9 shows in detail a synchronizing circuit;

FIG. 10, including A–I, is a diagram for explaining the operation of the circuit shown in FIG. 9;

FIG. 11 shows in detail a concrete example of the incrementor 478 shown in FIG. 4;

FIGS. 12A and 12B show in detail an incrementor controller;

FIG. 13, including A–E, shows the waveforms useful in explaining the processing of the fuel injection signal;

FIG. 14, including A–F, shows the waveforms useful in explaining the ignition timing control;

FIG. 15, including A–C, shows the waveforms useful in explaining the processing by EGR or NIDL;

FIG. 16, including A–D, shows the signal waveform useful in explaining the detection of the rotational speed RPM of engine or the speed VSP of vehicle;

FIG. 17 shows in block diagram a circuit for detecting stopping of engine;

FIG. 18, including A–F, shows waveforms useful in explaining the operation of the circuit shown in FIG. 17;

FIG. 19 schematically shows the structure of the MODE register;

FIG. 20 shows how the initial signal is generated;

FIG. 21 schematically shows the structure of the STATUS register;

FIG. 22 is a flow chart illustrating an interrupt due to stopping of the engine stop;

FIG. 23 shows a part of the ignition circuit;

FIG. 24 shows another example of an engine-stop detecting circuit;

FIG. 25 shows waveforms useful in explaining the operation of the circuit shown in FIG. 24;

FIG. 26 schematically shows a circuit for generating INTLDR pulses shown in FIG. 25; and FIG. 27 is a time chart illustrating the operation of the circuit shown in FIG. 26.

Figure 1:
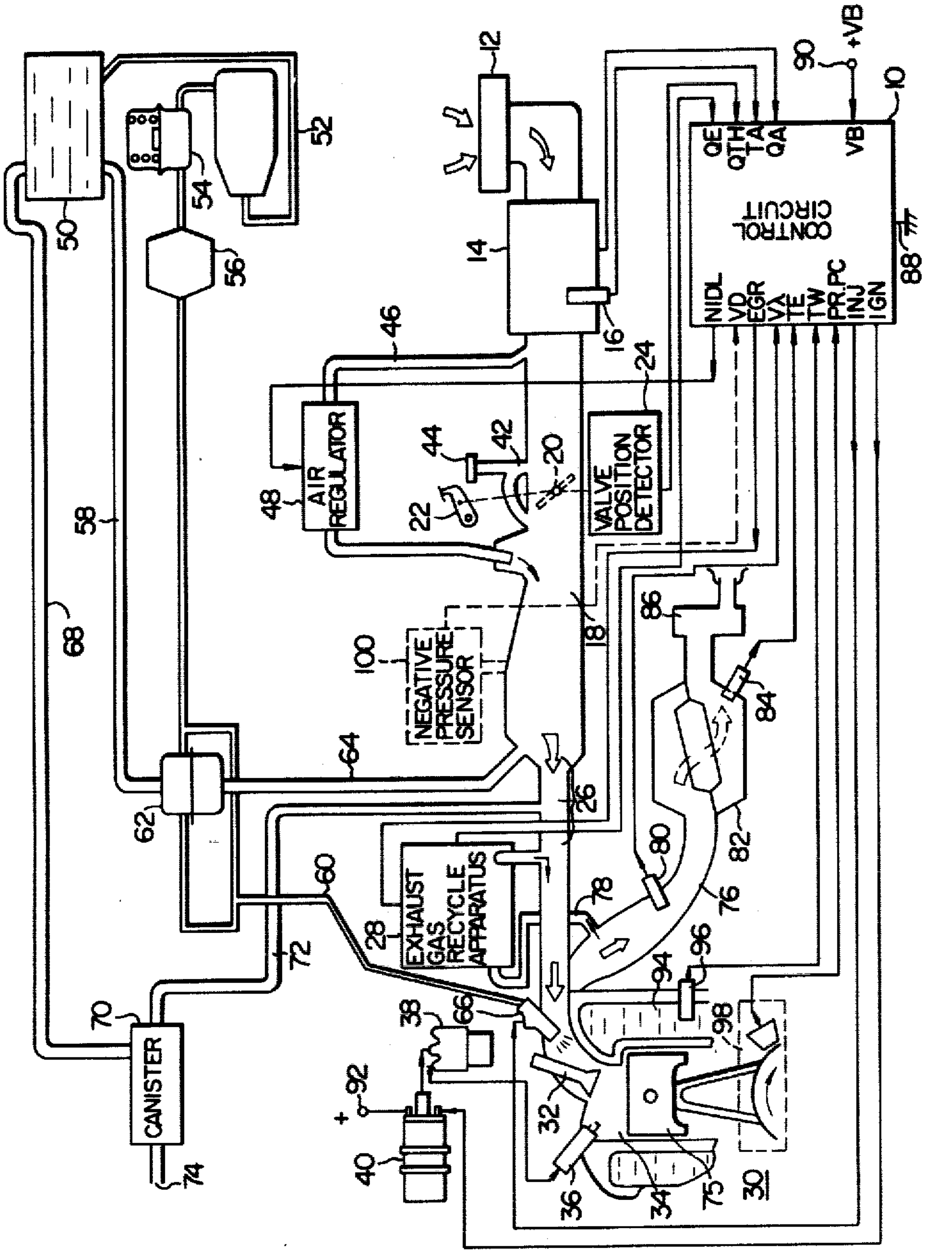

The electronic engine control apparatus will now be described by way of an embodiment with the aid of the attached drawings. FIG. 1 shows the main structure of an electronic engine control apparatus. Air sucked or drawn in through an air cleaner 12 is passed through an air-flow meter 14 to measure the flow rate thereof and the air-flow-meter 14 delivers an output QA indicating the flow rate of air to a control circuit 10. A temperature sensor 16 is provided in the air-flow meter 14 so as to detect the temperature of the sucked air and the output TA of the sensor 16, indicating the temperature of the sucked air, is also supplied to the control circuit 10.

The air flowing through the air-flow meter 14 is further passed through a throttle chamber 18, an intake manifold 26 and a suction or intake valve 32 to the combustion chamber 34 of an engine 30. The quantity of air drawn into the combustion chamber 34 is controlled by changing the aperture of a throttle valve 20 provided in the throttle chamber 18 and interlocked with an accelerator pedal 22. The aperture or opening of the throttle valve 20 is detected by detecting the valve position of the throttle valve 20 by a throttle valve position detector 24 and the signal QTH representing the valve position of the throttle valve 20 is supplied from the throttle valve position detector 24 to the control circuit 10.

The throttle chamber 18 is provided with a bypass 42 for idling the engine and an idle adjust screw 44 for adjusting the flow of air through the bypass 42. When the throttle valve 20 is completely closed, the engine is operated in the idling condition. The sucked air past the air-flow meter flows via the bypass 42 and drawn into the combustion chamber 34. Accordingly, the flow of the air sucked in under the idling condition is changed by adjusting the idle adjust screw 44. The energy created in the combustion chamber 34 is determined substantially depending on the flow rate of the air drawn through the bypass 42 so that the rotational speed of the engine under the idling condition can be adjusted to an optimal one by controlling the flow rate of air inhaled into the combustion chamber by adjusting the idle adjust screw 44.

The throttle chamber 18 is also provided with another bypass 46 and an air regulator 48. The air regulator 48 controls the flow rate of the air through the bypass 46 in accordance with the output signal NIDL of the control circuit 10, so as to control the rotational speed of the engine during the warming-up operation and to properly supply air into the combustion chamber at a sudden change, especially a sudden closing, in the valve position of the throttle valve 20. The air regulator 48 can also change the flow rate of air during the idling operation.

Next, the fuel supply system will be described. Fuel stored in a fuel tank 50 is sucked out to a fuel damper 54 by means of a fuel pump 52. The fuel damper 54 absorbs the pressure undulation of the fuel supplied from the fuel pump 52 so that fuel having a constant pressure can be supplied through a fuel filter 56 to a fuel pressure regulator 62. The fuel past the fuel pressure regulator 62 is sent by pressure to a fuel injector 66 through a fuel pipe 60 and the output INJ of the control circuit 10 causes the fuel injector 66 to be actuated to inject the fuel into the intake manifold 26.

The quantity of the fuel injected by the fuel injector 66 is determined by the period during which the fuel injector 66 is opened and by the difference between the pressure of the fuel supplied to the injector and the pressure in the intake manifold 26 into which the pressurized fuel is injected. It is however preferable that the quantity of the injected fuel should depend only on the period for which the injector is opened and which is determined by the signal supplied from the control circuit 10. Accordingly, the pressure of the fuel supplied by the fuel pressure regulator 62 to the fuel injector 66 is controlled in such a manner that the difference between the pressure of the fuel supplied to the fuel injector 66 and the pressure in the intake manifold 26 is always kept constant in any driving condition. The pressure in the intake manifold 26 is applied to the fuel pressure regulator 62 through a pressure conducting pipe 64. When the pressure of the fuel in the fuel pipe 60 exceeds the pressure upon the regulator 62 by a predetermined level, the fuel pipe 60 communicates with a fuel return pipe 58 so that the excessive fuel corresponding to the excessive pressure is returned through the fuel return pipe 58 to the fuel tank 50. Thus, the difference between the pressure of the fuel in the fuel pipe 60 and the pressure in the intake manifold 26 is always constant.

The fuel tank 50 is also provided with a pipe 68 connected to a canister 70 provided for the suction of vaporized fuel of fuel gas. When the engine is operating, air is sucked in through an open air inlet 74 to send the fuel gas into the intake manifold 26 and therefore into the engine 30 via a pipe 72. In the case of stopped engine, the fuel gas is exhausted through active carbon filled in the canister 70.

As described above, the fuel is injected by the fuel injector 66, the suction valve 32 is opened in synchronism with the motion of a piston 75, and a mixture gas of air and fuel is sucked into the combustion chamber 34. The mixture gas is compressed and fired by the spark generated by an ignition plug 36 so that the energy created through the combustion of the mixture gas is converted to mechanical energy.

The exhaust gas produced as a result of the combustion of the mixture gas is discharged into the open air through an exhaust valve (not shown), an exhaust pipe 76, a catalytic converter 82 and a muffler 86. The exhaust pipe 76 is provided with an exhaust gas recycle pipe 78 (hereafter referred to as an EGR pipe), through which a part of the exhaust gas is fed into the intake manifold 26, that is, the part of the exhaust gas is circulated to the suction side of the engine. The quantity of the circulated exhaust gas is determined depending on the aperture of the valve of an exhaust gas recycle apparatus 28. The aperture is controlled by the output EGR of the control circuit 10 and the valve position of the apparatus 28 is converted to an electric signal QE to be supplied as an input to the control circuit 10.

A λ sensor 80 is provided in the exhaust pipe 78 to detect the fuel-air mixture ratio of the mixture gas sucked into the combustion chamber 34. An oxygen sensor ($O_2$ sensor) is usually used as the λ sensor 80 and detects the concentration of oxygen contained in the exhaust gas so as to generate a voltage $V_\lambda$ corresponding to the concentration of the oxygen contained in the exhaust gas. The output $V_\lambda$ of the λ sensor 80 is supplied to the control circuit 10. The catalytic converter 82 is provided with a temperature sensor 84 for detecting the temperature of the exhaust gas in the converter 82 and the output TE of the sensor 84 corresponding to the temperature of the exhaust gas in the converter 84 is supplied to the control circuit 10.

The control circuit 10 has a negative power source terminal 88 and a positive power source terminal 90. The control circuit 10 supplies the signal IGN, for causing the ignition plug 36 to spark, to the primary winding of an ignition coil 40. As a result, a high voltage is induced in the secondary winding of the ignition coil 40 and supplied through a distributor 38 to the ignition plug 36 so that the plug 36 fires to cause the combustion of the mixture gas in the combustion chamber 34. The mechanism of the firing of the ignition plug 36 will be further detailed. The ignition coil 40 has a positive power source terminal 92 and the control circuit 10 also has a power transistor for controlling the primary current through the primary winding of the ignition coil 40. The series circuit of the primary winding of the ignition coil 40 and the power transistor is connected between the positive power source terminal 92 of the ignition coil 40 and the negative power source terminal 88 of the control circuit 10. When the power transistor is conducting, electromagnetic energy is stored in the ignition coil 40 and when the power transistor is cut off, the stored electromagnetic energy is released as a high voltage to the ignition plug 36.

The engine 30 is provided with a temperature sensor 96 for detecting the temperature of the water 94 as coolant in the water jacket and the temperature sensor 96 delivers to the control circuit 10 a signal TW corresponding to the temperature of the water 94. The engine 30 is further provided with an angular position sensor 98 for detecting the angular position of the rotary shaft of the engine and the sensor 98 generates a reference signal PR in synchronism with the rotation of the engine, e.g. every 120° of the rotation, and an angular position signal each time the engine rotates through a constant, predetermined angle (e.g. 0.5°). The reference signal PR and the angular position signal PC are both supplied to the control circuit 10.

In the system shown in FIG. 1, the air-flow meter 14 may be replaced by a negative pressure sensor. Such a negative pressure sensor 100 is depicted by dashed line and the negative pressure sensor 100 will supply to the control circuit 10 a voltage VD corresponding to the negative pressure in the intake manifold 26. A semiconductor negative pressure sensor is practically used as such a negative pressure sensor 100. One side of the silicon chip of the semiconductor is acted on by the boost pressure of the intake manifold while the atmospheric or a constant pressure is exerted on the other side of the chip. The constant pressure may be vacuum as the case may be. With this construction, a voltage VD corresponding to the pressure in the intake manifold is generated, which is to be supplied to the control circuit 10.

Figure 2:
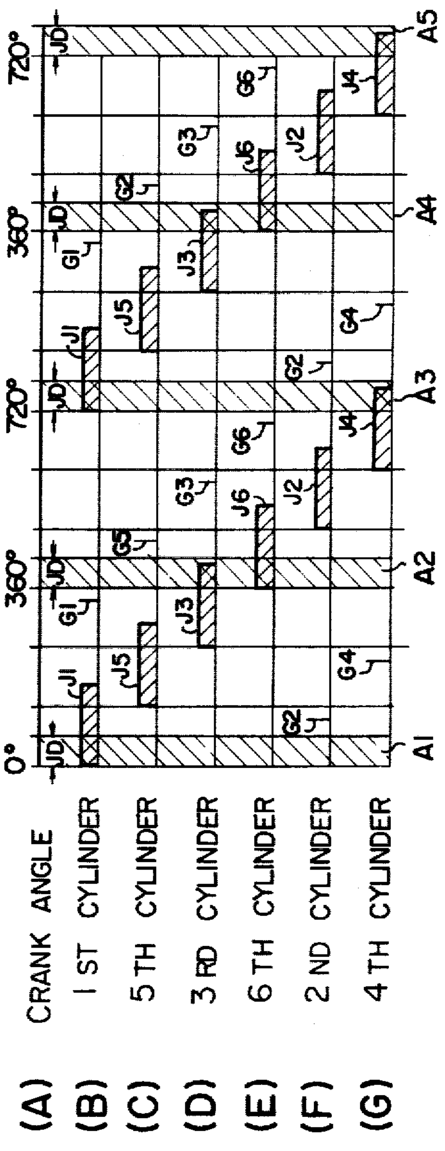

FIG. 2 illustrates the relationships between the firing timing and the crank angular position and between the fuel injection timing and the crank angular position, where a six-cylinder engine is used. In FIG. 2, diagram A represents the crank angular position and indicates that a reference signal PR is delivered by the angular position sensor 98 every 120° of the crank angle. The reference signal PR is therefore supplied to the control circuit 10 at 0°, 120°, 240°, 360°, 480°, 600°, 720° etc. of the angular position of the crank shaft.

Diagrams B, C, D, E, F and G correspond respectively to the 1st cylinder, the 5th cylinder, the 3rd cylinder, the 6th cylinder, the 2nd cylinder and the 4th cylinder. $J_1$–$J_6$ designate respectively the periods for which the suction valves of the corresponding cylinders are open. The periods are shifted by 120° of crank angle from one another. The beginning and the durations of the periods at which the suction valve is open are generally as shown in FIG. 2 though somewhat different depending upon the type of engine used.

$A_1$–$A_5$ indicate the periods for which the valve of the fuel injector 66 is open, i.e. fuel injection periods. The lengths JD of the periods $A_1$–$A_5$ can be considered to be the quantities of fuel injected at a time by the fuel injectors 66. The injectors 66, provided for the respective cylinders, are connected in parallel with the drive circuit in the control circuit 10. Accordingly, the signal INJ from the control circuit 10 opens the valves of the fuel injectors 66 simultaneously so that all the fuel injectors 66 simultaneously inject fuel. Now, the first cylinder will be taken as an example for description. The output signal INJ from the control circuit 10 is applied to the fuel injectors 66 provided respectively in the manifold or inlet ports of the respective cylinders in timing with the reference signal INTIS generated at 360° of crank angle. As a result, fuel is injected in by the injector 66 for the length JD of time calculated by the control circuit 10, as shown at $A_2$ in FIG. 2. However, since the suction valve of the 1st cylinder is closed, the injected fuel at $A_2$ is not sucked into the 1st cylinder, but kept stagnant near the inlet port of the 1st cylinder. In response to the next reference signal INTIS generated at 720° of crank angle, the control circuit 10 again sends a signal to the respective fuel injectors 66 to perform the fuel injections as shown at $A_3$ in FIG. 2. Simultaneously almost with the fuel injections, the suction valve of the 1st cylinder is opened to cause the fuel injected at $A_2$ and the fuel injected at $A_3$ to be sucked into the combustion chamber of the 1st cylinder. The other cylinders will be also subjected to similar series of operations. For example, in case of the 5th cylinder corresponding to the diagram C, the fuel injected at $A_2$ and $A_3$ is sucked in at the period $J_5$ for which the suction valve of the 5th cylinder is opened. In case of the 3rd cylinder corresponding to the diagram D, a part of the fuel injected at $A_2$, the fuel injected at $A_3$ and a part of the fuel injected at $A_4$ are sucked in together while the suction valve is open for the period $J_3$. The part of the fuel injected at $A_2$ plus the part of the fuel injected at $A_4$ equals a quantity of fuel injected by a fuel injector at a single actuation. Therefore, also during the suction step of the 3rd cylinder, the quantity of fuel equal to the total quantities supplied through duble actuations of the fuel injector will be sucked in. Also, in case of the 6th, 2nd or 4th cylinder as shown in the diagram E, F or G, the double quantity of fuel is sucked in during a single step of suction. As apparent from the above description, the quantity of fuel determined by the fuel injection signal INJ from the control circuit 10 is equal to half the quantity of fuel to be sucked into the combustion chamber. Namely, the necessary quantity of fuel corresponding to the quantity of air sucked into the combustion chamber 34 will be supplied through the double actuations of the fuel injector 66.

Throughout the diagrams A to G in FIG. 2, $G_1$-$G_6$ indicate the ignition times associated respectively with the 1st to 6th cylinders. When the power transistor provided in the control circuit 10 is cut off, the primary current of the ignition coil 40 is interrupted so that a high voltage is induced across the secondary winding. The induction of the high voltage takes place in timing with the ignition epochs $G_1$, $G_5$, $G_3$, $G_6$, $G_2$ and $G_4$. The induced high voltage is distributed to the spark plugs provided in the respective cylinders by means of a distributor 38. Accordingly, the spark plugs of the 1st, 5th, 3rd, 6th, 2nd and 4th cylinders fire successively in this order to inflame the combustible mixture of fuel and air.

Figure 3:
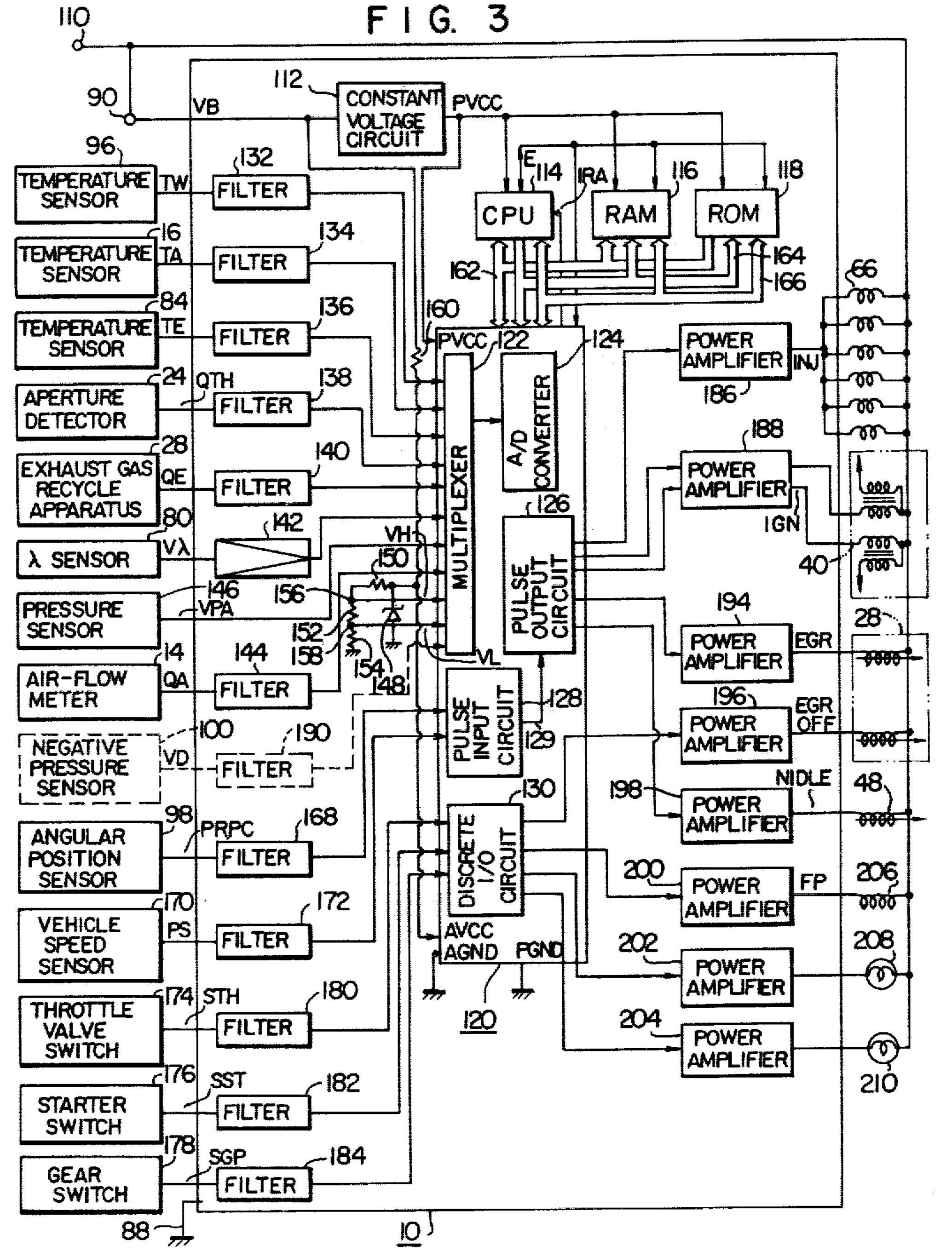
FIG. 3 shows the detail of the control circuit shown in FIG. 1.

FIG. 3 shows an example of the detail of the control circuit 10 shown in FIG. 1. The positive power source terminal 90 of the control circuit 10 is connected with the positive electrode 110 of a battery to provide a voltage VB for the control circuit 10. The power source voltage VB is adjusted to a constant voltage PVCC of, for example, 5 volts by a constant voltage circuit 112. This constant voltage PVCC is applied to a central processor unit (hereafter referred to as CPU), a random access memory (hereafter referred to as RAM) and a read-only memory (hereafter referred to as ROM). The output PCVV of the constant voltage circuit 112 is supplied also to an input/output circuit 120.

The input/output circuit 120 includes therein a multiplexer 122, an analog-digital converter 124, a pulse output circuit 126, a pulse input circuit 128 and a discrete input/output circuit 130.

The multiplexer 122 receives plural analog signals, selects one of the analog signals in accordance with the instruction from the CPU, and sends the selected signal to the A/D converter 124. The analog signal inputs applied through filters 132 to 144 to the multiplexer 122 are the outputs of the various sensors shown in FIG. 1; the analog signal TW from the sensor 96 representing the temperature of the cooling water in the water jacket of the engine, the analog signal TA from the sensor 16 representing the temperature of the sucked air, the analog signal TE from the sensor 84 representing the temperature of the exhaust gas, the analog signal QTH from the throttle aperture detector 24 representing the aperture of the throttle valve 20, the analog signal QE from the exhaust recycle apparatus 28 representing the aperture of the valve of the apparatus 28, the analog signal $V_\lambda$ from the λ sensor 80 representing the air-excess rate of the sucked mixture of fuel and air, and the analog signal QA from the air-flow meter 14 representing the flow rate of air. The output $V_\lambda$ of the λ sensor 80 above is supplied through an amplifier with a filter circuit to the multiplexer 122.

The analog signal VPA from an atmospheric pressure sensor 146 representing the atmospheric pressure is also supplied to the multiplexer 122. The voltage VB is applied from the positive power source terminal 90 to a series circuit of resistors 150, 152 and 154 through a resistor 160. The series circuit of the resistors 150, 152 and 154 is shunted with a Zener diode 148 to keep the voltage across it constant. To the multiplexer 122 are applied the voltages VH and VL at the junction points 156 and 158 respectively between the resistors 150 and 152 and between the resistors 152 and 154.

The CPU 114, the RAM 116, the ROM 118 and the input/output circuit 120 are interconnected respectively by a data bus 162, an address bus 164 and a control bus 166. A clock signal E is supplied from the CPU to the RAM, ROM and input/output circuit 120 and the data transfer takes place through the data bus 162 in timing with the clock signal E.

The multiplexer 122 of the input/output circuit 120 receives as its analog inputs the cooling water temperature TW, the temperature TA of the sucked air, the temperature TE of the exhaust gas, the throttle valve aperture QTH, the quantity QE of recycle exhaust gas, the output $V_\lambda$ of the λ sensor, the atmospheric pressure VPA, the quantity QA of the sucked air and the reference voltages VH and VL. The quantity QA of the sucked air may be replaced by the negative pressure VD in the intake manifold. The CPU 114 specifies the address of each of these analog inputs through the address bus 164 in accordance with the instruction program stored in the ROM 118 and the analog input having a specified address is taken in. The analog input taken in is sent through the multiplexer 122 to the analog/digital converter 124 and the output of the converter 124, i.e. the digital-converted value, is held in the associated register. The stored value is coupled, if desired, to the CPU 114 or RAM 116 in response to the instruction sent from the CPU 114 through the control bus 166.

The pulse input circuit 128 receives as inputs a reference pulse signal PR and an angular position signal PC both in the form of a pulse train from the angular position sensor 98 through a filter 168. A pulse train of pulses PS having a repetition frequency corresponding to the speed of the vehicle is supplied from a vehicle speed sensor 170 to the pulse input circuit 128 through a filter 172. The signals processed by the CPU 114 are held in the pulse output circuit 126. The output of the pulse output circuit 126 is sent to a power amplifying circuit 186 and the fuel injector 66 is controlled by the output signal of the power amplifying circuit 186.

Power amplifying circuits 188, 194 and 198 respectively control the primary current of the ignition coil 40, the aperture of the exhaust recycle apparatus 28 and the aperture of the air regulator 48 in accordance with the output pulses of the pulse output circuit 126. The discrete input/output circuit 130 receives signals from a switch 174 for detecting the completely closed state of the throttle valve 20, from a starter switch 176, and from a gear switch 178 indicating that the transmission gear is in the top position, respectively through filters 180, 182 and 184 and holds the signals. The discrete input/output circuit 130 also receives and holds the processed signals from the central processor unit CPU 114. The discrete input/output circuit 130 treats the signals the content of each of which can be represented with a single bit. In response to the signal from the central processor unit CPU 114, the discrete input/output circuit 130 sends signals respectively to the power amplifying circuits 196, 200, 202 and 204 so that the exhaust recycle apparatus 28 is closed to stop the recycle of exhaust gas, the fuel pump is controlled, the abnormal temperature of the catalyzer is indicated by a lamp 208 and the overheat condition of the engine is displayed by a lamp 210.

FIG. 4 shows in detail a concrete example of the pulse output circuit 126. a register group 470 comprises reference registers which serve to hold the data processed by the CPU 114 and the data representing the predetermined fixed values. These pieces of data are transferred from the CPU 114 to the reference register group 470 through the data bus 162. Each of the registers is specified through the address bus 164 to receive and hold the associated data.

A register group 472 comprises instantaneous registers which serve to hold the instantaneous states of the engine and the associated mechanisms. The instantaneous register group 472, a latch circuit 476 and an incrementor 478 form a counter.

An output register group 474 comprises, for example, a register 430 for holding the rotational speed of the engine and a register 432 for holding the vehicle speed. The registers 430 and 432 hold the values by taking in the contents of the instantaneous registers when certain conditions are satisfied. Each register of the output register group 474 is selected by the signal sent from the CPU 114 through an address bus and the content of the selected register is sent to the CPU 114 through the data bus 162.

A comparator 480 receives, for comparison, at its input terminals 482 and 484 the reference data from selected registers of the reference register group and the instantaneous data from selected registers of the instantaneous register group. The result of the comparison by the comparator 480 is delivered at its output terminal 486. The output delivered at the output terminal 486 is set in the selected registers of a first comparison output register group, 502 serving as a comparison result holding circuit, and then set in the corresponding registers of a second comparison output register group 504.

The operations of accessing, i.e. reading out of or writing in, the reference register group 470, the instantaneous register group 472 and the output register group 474, the operations of the incrementor 478 and the comparator 480, and the operations of setting the output of the comparator 480 in the first and second comparison output register groups 502 and 504 are all processed within a predetermined period of time. Other various processing operations are performed in a time sequential manner or in a time-division manner in accordance with the order of the stages instructed by a stage counter 572. In each stage, one of the registers constituting the reference register group 470, one of the registers of the instantaneous register group 472, one of the registers of the first comparison result register group 502, one of the registers of the second comparison result register group 504 and, if necessary, one of the registers of the output register groups 474 are selected. The incrementor 478 and the comparator 480 are used in common.

FIG. 5 shows diagrams useful in explaining the operation of the circuit in FIG. 4. The clock signal E, shown in the diagram A, is supplied from the CPU 114 to the input/output circuit 120. Two clock signals $\phi 1$ and $\phi 2$, as shown in the diagram B and C, having no overlap with each other are derived from the clock signal E by means of a pulse generating circuit 574. The circuit shown in FIG. 4 is operated by these clock signals $\phi 1$ and $\phi 2$.

The diagram D in FIG. 5 depicts a stage signal which is switched over during the rising transient of the clock signal $\phi 2$. The processing in each stage is performed in synchronism with the clock signal $\phi 2$. In FIG. 5, "THROUGH" indicates that the latch circuit and the register circuits are in their enabled conditions and that the outputs of these circuits depend on the inputs thereto. Also, "LATCH" means that these circuits hold certain data and that the outputs therefrom are independent of the inputs thereto.

The stage signal shown in the diagram D serves to read data out of the reference register group 470 and the instantaneous register group 472, that is, to read out the contents of certain selected registers of the groups. The diagrams E and F represent the operations of the reference and instantaneous register groups 470 and 472, respectively. These operations are performed in synchronism with the clock signal $\phi 1$.

The diagram G indicates the operation of the latch circuit 476. The latch circuit 476 is in, the THROUGH state when the clock signal $\phi 2$ is at high level, serving to take in the content of a particular register selected from among the instantaneous register group 472. When the clock signal $\phi 2$ is at low level, on the other hand, the latch circuit 476 is in the LATCH state. Thus, the latch circuit 476 serves to hold the content of the specific register of the instantaneous register group selected in accordance with the stage assumed then. The data held in the latch circuit 476 is increased or not on the basis of external conditions by means of the incrementor 478 operated out of timing with the clock signal.

The incrementor 478 performs the following functions in response to the signal from the incrementor controller 490. The first function is the function of incrementing, to increase by unity the value of the input data. The second is the function of non-incrementing, to pass the input without any change. The third is the function of resetting, to change the entire input into data representing the value 0 (zero).

As seen from the flow of data through the instantaneous register group 472, one register of the group 472 is selected by the stage counter 572 and the data held by the selected register is supplied to the comparator 480 through the latch circuit 476 and the incrementor 478. Further, there is provided a return loop for the signal from the output of the incrementor 478 to the selected register, a complete closed loop being formed. Therefore, since the incrementor has a function of increasing the data by unity, the closed loop functions as a counter. However, if the data delivered from the particular register selected from the instantaneous register group is again received by the particular register as an input by coming back through the return loop, an erroneous operation will easily take place. The latch circuit 476 is provided to block unwanted data. Namely, the latch circuit 476 assumes the THROUGH state in timing with the clock signal $\phi 2$ while the THROUGH state in which input data is to be written in the instantaneous registers is in timing with the clock signal $\phi 1$. Therefore, data is interrupted or cut at the offset between the clock signals $\phi 1$ and $\phi 2$. Namely, even if the content of any specific register of the group 472 is changed, the output of the latch circuit 476 remains unchanged.

The comparator 480, just like the incrementor 478, operates out of timing with the clock signals. The comparator 480 receives as its inputs the data held in a register selected from among the reference register group 470 and the data held in a register selected from among the instantaneous register group 472 and sent through the latch circuit 476 and the incrementor 478. The result of the comparison of both data is set in the first comparison result register group 502 which takes the THROUGH state in timing with the clock signal $\phi 1$. The set data is further set in the second comparison result register group 504 which assumes the THROUGH state in synchronism with the clock signal $\phi 2$. The outputs of the register group 504 are the signals for controlling the various functions of the incrementor and the signals for driving the fuel injectors, the ignition coil and the exhaust gas recycle apparatus.

Also, in response to the signals, the results of the measurements of the rotational speed of the engine and the vehicle speed are transferred from the instantaneous register group 472 to the output register group 474 in every stage. For example, in the case of writing the rotational speed of the engine, a signal indicating that a preset time has elapsed, is held in the register RPMWBF 552 of the second comparison result register group 504 and the data held in the register 462 of the instantaneous register group 472 is transferred to the register 430 of the output register group 474 in response to the output of the register 552 in the RPM stage listed in the table 1 given later.

On the other hand, unless a signal indicating the elapse of the preset time is set in the register RPMWBF 552, the operation to transfer the data held in the register 462 to the register 430 never takes place even in the RPM stage.

The data held in the register 468 of the group 472 and representing the vehicle speed VSP is transferred to the output register 432 of the group 474 in response to the signal from the register VSPWBF 556 of the group 504 in the VSP stage.

The writing of the data representing the rotational speed RPM of the engine or the vehicle speed VSP in the output register group 474 is performed as follows. Reference should be had again to FIG. 5. When the stage signal STG is in the RPM or VSP mode, the data from the register 462 or 468 of the instantaneous register group 472 is written in the latch circuit 476 if the clock signal $\phi 2$ is at a high level since the latch circuit 476 takes the THROUGH state when the clock signal $\phi 2$ is at high level. And when the clock signal $\phi 2$ is at low level, the written data is in the latched state. The thus held data is then written in the output register group 474 in timing with the high level of the clock signal $\phi 1$ in response to the signal from the register RPMWBF 552 or VSPWBF 556 since the output register group 474 assumes the THROUGH state when the clock signal $\phi 1$ is at high level, as indicated at the diagram K of FIG. 5. The written data is latched at the low level of the clock signal $\phi 1$.

In the case of reading the data held in the output register group 474 by the CPU 114, the CPU 114 first selects one of the registers 430 and 432 of the group 474 through the address bus 164 and then takes in the content of the selected register in timing with the clock signal E shown in the diagram A of FIG. 5.

FIG. 6 shows an example of a circuit for generating the stage signal STG shown in the diagram D of FIG. 5. The contents of a stage counter SC570 are incremented in response to the signal $\phi 1$ sent from the pulse generating circuit 574 which is per se well-known. The outputs $C_0$–$C_6$ of the stage counter SC570 and the outputs of the T register shown in FIG. 4 are supplied as inputs to a stage decoder SDC. The stage decoder SDC delivers as its outputs signals 01–017 and the signals 01–017 are written in a stage latch circuit STGL in timing with the clock signal $\phi 2$.

The reset input terminal of the stage latch circuit STGL receives a signal GO of bit 2° from the mode register shown in FIG. 4 and when the signal GO of bit 2° takes its low level, all the outputs of the stage latch circuit STGL are at the low level to stop all the processing operations. If, on the other hand, the signal GO resumes the high level, the stage signals STG are successively delivered again in the predetermined order to perform the corresponding processings.

The above stage decoder SDC can be easily realized by the use of, for example, a ROM (read-only memory). The table 1 given below lists up the details of the contents 00–7F of the stage signals STG delivered as outputs from the stage latch circuit STGL.

TABLE 1

| $C_0$–$C_2$ | (Hexadecimal) $C_3$–$C_6$ 0 | 1 | 2 | 3 | 4 | 5 | 6 | 7 |
|---|---|---|---|---|---|---|---|---|
| 0 | EGRP | INTL | CYL | ADV | DWL | VSP | RPM | INJ |
| 1 | NIDLP | INTL | CYL | ADV | DWL | VSP | RPM | INJ |
| 2 | — | INTL | CYL | ADV | DWL | VSP | RPM | INJ |
| 3 | RPMW | INTL | CYL | ADV | DWL | VSP | RPM | INJ |
| 4 | ENST | INTL | CYL | ADV | DWL | VSP | RPM | INJ |
| 5 | — | INTL | CYL | ADV | DWL | VSP | RPM | INJ |
| 6 | — | INTL | CYL | ADV | DWL | VSP | RPM | INJ |
| 7 | — | INTL | CYL | ADV | DWL | VSP | RPM | INJ |
| 8 | EGRD | INTL | CYL | ADV | DWL | VSP | RPM | INJ |
| 9 | NIDLD | INTL | CYL | ADV | DWL | VSP | RPM | INJ |
| A | — | INTL | CYL | ADV | DWL | VSP | RPM | INJ |
| B | VSPW | INTL | CYL | ADV | DWL | VSP | RPM | INJ |
| C | INTV | INTL | CYL | ADV | DWL | VSP | RPM | INJ |
| D | — | INTL | CYL | ADV | DWL | VSP | RPM | INJ |
| E | — | INTL | CYL | ADV | DWL | VSP | RPM | INJ |
| F | — | INTL | CYL | ADV | DWL | VSP | RPM | INJ |

First, a general reset signal GR is received at the reset terminal R of the stage counter SC570 shown in FIG. 6 so that all the outputs $C_0$–$C_6$ of the stage counter SC570 become "0" (zero). The general reset signal is delivered from the CPU at the time of starting the control circuit 10. Under the above condition, if the clock signal $\phi 2$ is received, a stage signal EGRPSTG is delivered in timing with the rising transient of the signal $\phi 2$. According to the stage signal EGRPSTG, a processing EGRP is performed. Upon reception of a pulse of the clock signal $\phi 1$, the stage counter SC570 counts up to increase its content by unity and then the arrival of the clock signal $\phi 2$ causes the next stage signal INTLSTG to be delivered. A processing INTL is preformed according to the stage signal INTLSTG. Thereafter, a stage signal CYLSTG is delivered for the execution of a processing CYL and then a stage signal ADVSTG for a processing ADV. In like manner, as the stage counter SC570 continues to count up in timing with the clock signal $\phi 1$, other stage signals STG are delivered in timing with the clock signal $\phi 2$ and the processings according to the stage signals STG are executed.

When all the outputs $C_0$–$C_6$ of the stage counter SC570 become "1", a stage signal INJSTG is delivered for the execution of a processing INJ, which terminates the whole processings listed in the above table 1. Upon reception of the next clock signal $\phi 1$, all the outputs $C_0$–$C_6$ of the stage counter SC570 becomes zero and the stage signal EGRPSTG is delivered again for the execution of the processing EGRP. In this way, the processings listed in the table 1 will be repeated.

The processings in the respective stages, listed in the table 1 will be detailed in the following table 2.

TABLE 2

| Stage Signal | Type of Processing Operation Corresponding to Stage Signal |
|---|---|
| EGRPSTG | to determine whether or not the period of time determined by the data held in the register 418 has elapsed, so as to determine the period of the pulse current for driving the valve of the exhaust gas recycle apparatus. |
| INTLSTG | to determine whether or not the engine has rotated through an angle corresponding to the data held in the register 406, on the basis of the reference signal PR from the angular position sensor, so as to generate a reference signal INTLS. |
| CYLSTG | to determine whether or not the reference signals INTLS represented by the data held in the register 404 have been generated, so as to generate a signal CYL indicating a single rotation of the crank shaft. |
| ADVSTG | to determine whether or not the engine has rotated through an angle corresponding to the data held in the register 414, on the basis of the reference signal, so as to generate an ignition timing signal. |
| DWLSTG | to judge whether or not the engine has rotated through an angle corresponding to the data held in the register 416, after the generation of the immediately previous reference signal, so as to generate a signal indicating the initial conduction point of the primary current through the ignition coil. |
| VSPSTG | to hold, for detecting the vehicle speed, the data corresponding to the actually measured vehicle speed in the output register when the lapse of a predetermined period of time is ascertained on the basis of the signal (output of VSPWBF) representing the lapse of the predetermined period of time and to continue to further count the vehicle speed pulses when the predetermined period of time has not yet lapsed. |
| RMSTG | to hold, for detecting the rotational speed of the engine, the data corresponding to the actually measured vehicle speed in the output register when the lapse of a predetermined period of time is ascertained on the basis of the signal (output of RPMBF) representing the lapse of the predetermined period of time and to continue to further count the angular position signals when the predetermined period of time has not yet elapsed. |
| INJSTG | to determine whether or not the time corresponding to the data held in the register 412 has elapsed, on the basis of the signal CYL, so as to produce a signal INJ representing the valve opening period for the fuel injector. |
| NIDLPSTG | to determine whether or not the time corresponding to the data held in the register 422 has elasped, so as to determine the period of the pulse current for driving the air regulator. |
| RPMWSTG | to determine whether or not a predetermined period of time for which the pulses synchronous with the rotation of the engine are to be counted has elapsed, so as to measure the rotational speed of the engine. |
| ENSTSTG | to detect the condition that there is no signal delivered from the angular position sensor for a preset period of time, so as to detect an accidental stopping of engine. |
| EGRDSTG | to determine whether or not the duration of the pulse of the pulse current for driving the valve of the exhaust gas recycle apparatus has become coincident with the value corresponding to the data held in the register 420. |
| NIDLDSTG | to determine whether or not the pulse duration of the pulse current for driving the air regulator has become coincident with the value corresponding to the data held in the register 424. |
| VSPWSTG | to determine whether or not a preset period of time for which the pulses synchronous with the vehicle speed are to be counted has lapsed, so as to measure the vehicle speed. |
| INTVSTG | to determine whether or not the period of time corresponding to the data held in the register 408 has elapsed. |

In the stage latch circuit STGL shown in FIG. 6, the circuit components associated with the output signals STG0 and STG7 serve to synchronize externally supplied signals with the clock signal produced in the input/output circuit 120. The output STG0 is delivered when all the outputs $C_0$–$C_2$ of the stage counter SC570 are zero "0" while the output STG7 is delivered when all the outputs $C_0$–$C_2$ are one "1".

Examples of the external signals are the reference signal PR generated in timing with the rotation of the engine, the angular position signal and the vehicle speed pulse signal PS generated in synchronism with the rotation of the wheel. The periods of these signals, which are pulse signals, vary to a considerable extent and therefore the signals, if not controlled, are by no means synchronous with the clock signals $\phi$1 and $\phi$2. Accordingly, there is no determination of whether the increment operation is performed or not, in the stage ADVSTG, VSPSTG or RPMSTG in the table 1.

It is therefore necessary to synchronize the external pulse signal, for example, a sensor and the stage of the input/output circuit. For the improvement in the detection accuracy, the angular position signal PC and the vehicle speed signal PS must have their rising and falling transient synchronized with the stage while the reference signal PR must have its rising edge synchronized with the stage.

FIG. 7 shows the details of the register groups 470 and 472.

First, the input of data to the reference register group will be described. Input data is supplied to a latch circuit 802 through the data bus 162. Simultaneously, a read/write signal R/W and a signal VMA are supplied from the CPU through the control bus 166. The registers in the input/output circuit are selected through the address bus 164. As is well known, a technique of selecting the registers is to decode the data sent through the address bus into the signals corresponding to the respective registers and the decoding is effected by an Address Decoder 804. The outputs of the decoder 804 are connected with the registers specified by the symbols labeled at the respective outputs (wiring is omitted). In accordance with the above mentioned read/write signal R/W, signal VMA and the address bus bit A15 corresponding to the input/output circuit, the select chip write and the select chip read signals CSW and CSR are sent through gates 806 and 808 respectively.

In the case of the writing of the data from the CPU, the select chip write signal CSW is delivered and applied to the input side of the registers. Now, the select chip read signal CSR is not delivered and therefore the gate 810 is closed and the tri-state buffer 812 is closed.

The data sent through the data bus 162 is latched by the latch circuit WDL 802 in timing with the clock signal $\phi$2. The data latched in the latch circuit 802 is transferred through the write bus driver WBD to the respective registers of the reference register group 470 and written in the registers selected by the address decoder in timing with the signal $\phi$1. The registers 408, 410, 412, 414, 416, 426 and 428 of the group 470 have 10 bits each and both the CPU and the data bus are designed to treat data of 8 bits, so that the upper two bits and the lower eight bits of the ten-bit data are given two different addresses. Accordingly, the transfer of data to the 10-bit register takes place twice per data.

On the other hand, the reading process is contrary to this. The chip select gate 808 is selected by the output sent through the control bus and the buffer 812 is opened by the output of the gate 810 in timing with the signal E. Since at this time a desired register is selected by the address signal sent through the address bus 164, the data in the selected register is delivered through the tri-state (three-state) buffer 812 onto the data bus 162.

Next, description will be made of the operation to select the reference register and the instantaneous register in accordance with the stage signal. The reference and instantaneous register groups 470 and 472 receive the stage signals. In response to the stage signals, the corresponding registers are selected in the respective stages. Of the reference register group 470, the registers 412, 414 and 416 do not receive the stage signals and therefore are not selected, when the corresponding outputs INJBF, ADVBF and DWLBF are delivered from the comparison result holding register group 504. Instead, when the signals INJBF, ADVBF and DWLBF are received, the zero register 402 is selected in the stages INJ, ADV and DWL. Concerning the instantaneous register group 472, the register 456 receives the stage signals EGRP and EGRD and the register 458 receives the stage signals NIDLP and NIDLD. Thus, the register 456 is selected together with the reference register 418 or 420 in the stage EGRPSTG or EGRDSTG, respectively. And the register 458 is selected together with the reference register 422 or 424 in the stage NIDLPSTG or NIDLDSTG, respectively.

FIG. 8 shows in detail the first and second comparison output register groups 502 and 504 shown in FIG. 4. The output of the comparator 480 is divided into a signal indicating an EQUAL condition and a signal indicating a LARGER condition and both the signals are sent to the NOR gate 832. Accordingly, the output of the NOR gate 832 indicates an EQUAL OR LARGER condition. Since the NAND gate 830 receives the EQUAL signal from the comparator 480 and the signal for selecting the ZERO register 402, the signal indicating the EQUAL condition is blocked by the NAND gate 830 is the ZERO register 402 is selected. As a result, the output of the NOR gate 832 is only the signal indicating the LARGER condition. It is necessary to select the respective registers of the first comparison output register group 502 in timing with the respective registers of the reference and instantaneous register groups. Therefore, the registers of the group 502 receives the clock signal $\phi 1$ and the corresponding stage signals to be set in synchronism with the corresponding reference and instantaneous registers. As a result, the result of comparison made in each stage is latched in the associated register of the first comparison output register group in timing with the clock signal $\phi 1$. Since the second comparison output register group 504 receives the clock signal $\phi 2$ for its set timing, the above result of comparison is set in the second comparison output register group in timing with the clock signal $\phi 2$ delayed with respect to the clock signal $\phi 1$. Then, the registers of the group 504 deliver their respective BF outputs.

The registers 512, 528, 552, 556, 516 and 520 of the second comparison output register group 504 are provided respectively with the waveform shaping circuits 840, 832, 844, 846, 848 and 850, which respectively deliver pulses INTLD, ADVD, RPMWD, VSPWD, INTVD and ENSTD performing their duties only during the period from the instant that the register group 504 is set to the next arrival of the stage signal ZEROSTG.

For the purpose of detecting the pulse train signals supplied from the various sensors to the input/output circuit, it is necessary to synchronize these pulse train signals with the operation of the input/output circuit. For, since the periods or the pulse durations of these pulse train signals vary depending on, for example, the rotational speed of the engine and the vehicle speed to considerable extents, each lengthened period may equal several times the period of the corresponding stage while each shortened period may be too short in comparison with that of the corresponding stage to exist until the corresponding stage signal is received. Therefore, if these pulse train signals are not suitably controlled, the exact counting of the pulse trains will be impossible.

FIG. 9 shows an example of a synchronizing circuit for synchronizing the external pulse train signals with the stage signals in the input/output circuit and FIG. 10 shows a timing chart useful in explaining the operation of the synchronizing circuit shown in FIG. 9.

The external input pulse signals from the various sensors, such as the reference pulses PR, the angular position signal PC and the vehicle speed signal PS are latched respectively in the latch circuits 600, 602, 604 in response to the output STG0 shown in FIG. 6.

In FIG. 10, the diagram A corresponds to the waveform of the clock signal $\phi 2$, B to the clock signal $\phi 1$, and C and D to the stage signals STG7 and STG0. These stage signals are generated in timing with the clock signal $\phi 2$. The signal waveform of the diagram E is of the output pulse from the angular position sensor or the vehicle speed sensor, corresponding to the reference pulse PR or the angular position pulse PC or the vehicle speed pulse PS. The time of occurrence, the duty cycle and the period of the signal shown in the diagram E are irregular, the signal being received independent of the corresponding stage signal.

Now, let it be assumed that the signal as shown in the diagram E is received by the latch circuits 600, 602 and 604. Then, they are latched in response to the stage signal STG0 (pulse S1 in diagram D). Accordingly, the outputs A1, A2 and A3 take the high level at an instant S2, as shown in diagram F. Also, since the input signals PR, PC and PS are at the high level when the stage signal STG0 represented by the pulse S3 is received, the high level is latched in the latch circuits 600, 602 and 604. On the other hand, since the input signals PR, PC and PS are at the low level when the stage signal STG0 represented by the pulse S4 is received, the low level is latched in the latch circuits 600, 602 and 604. As a result, the outputs A1, A2 and A3 of the latch circuits 600, 602 and 604 are as shown in the diagram F of FIG. 10. Since the latch circuits 606, 608 and 610 respectively latch the outputs A1, A2 and A3 of the latch circuits 600, 602 and 604 in response to the stage signal STG7 represented by the pulse S5 shown in the diagram C, the outputs B1, B2 and B3 of the latch circuits 606, 608 and 610 rise at the instant S6. Also, since they latch the high level when the stage signal STG7 represented by the pulse S7 is received, they continue to deliver the high level output. Therefore, the output signals B1, B2 and B3 of the latch circuit 606, 608 and 610 are as shown in the diagram G of FIG. 10.

The NOR circuit 612 receives the signal B1 and the inverted version of the signal A1 through the inverter 608 and delivers the synchronized reference signal PRS as shown in the diagram H of FIG. 10. This synchronized reference signal PRS is generated in response to the leading edge of the stage signal STG0 under the condition that the reference signal PR has changed from a low level to a high level and disappears in response to the leading edge of the stage signal STG7 and so has a pulse duration from the leading edge of the stage signal STG0 to the leading edge of the stage signal STG7. The exclusive OR circuits 614 and 616 receive the signals A2 and B2 and the signals A3 and B3. The signal S8 is generated in response to the leading edge of the stage signal STG0 when the stage signal STG0 is generated after the signal PC or PS is changed from a low to a high level and disappears in response to the leading edge of the stage signal STG7, while the signal S9 is generated in response to the leading edge of the stage signal STG0 when the signal STG0 is generated after the signal PC or PS is changed from a high to a low level and disappears in response to the leading edge of the stage signal STG7. The duty cycles of the signals S8 and S9 are equal to that of the signal shown in the diagram H of FIG. 10, and therefore determined by the stage signals STG0 and STG7.

In the above description, it is assumed that the signals PR, PC and PS have the same duty cycle and that they are simultaneously received. In practice, however, they have different duty cycles and are received at different instants. Further, each signal itself has its period and duty cycle varied with time.

The synchronizing circuit shown in FIG. 9 serves to render the irregular duration of the signal constant. The constant pulse duration is determined by the difference between the rising instants of the stage signals STG0 and STG7. Therefore, the pulse widths or durations can be controlled by controlling the stage signals supplied to the latch circuits 600, 602, 604, 606, 608 and 610.

The pulse durations are determined depending on the timing of the stages listed in the table 1. Namely, as seen from the table 1, the stage INTL corresponds to the condition that the outputs of the counters $C_0$–$C_2$ and the outputs of the counters $C_3$–$C_6$ are respectively 1 and 0, i.e. $(C_0–C_2, C_3–C_6)=(1, 0)$ and further the conditions that $(C_0–C_2, C_3–C_6)=(1, 1), (1, 2), (1, 3) \ldots$, thus the stage INTL appears every eighth stage.

Since each stage is processed in 1 μsec, the stage INTL appears every 8 μsec. In the stage INTL, the angular position signal PC must be detected to control the incrementor and when the output PC of the angular position sensor 98 is supplied to the synchronizing circuit shown in FIG. 9, the circuit generates the synchronizing pulses which coincide in timing with the stage INTL so that the incrementor controller is controlled by the synchronizing pulses PCS in the stage INTL.

The synchronizing pulse signal PCS is detected also in the stage ADV or RPM. The stage ADV or RPM appears whenever each of the values of the outputs $C_3$–$C_6$ is incremented by unity while each of the values of the outputs $C_0$–$C_2$ is 3 or 6, respectively. Each of the stages ADV and RPM reappears at a period of 8 μsec.

The signal STG0 shown in FIG. 9 is delivered when the values of the outputs $C_0$–$C_2$ of the stage counter SC570 are 0 while the signal STG7 is delivered when the bits $C_0$–$C_2$ having a decimal value of 7. The stage signals STG0 and STG7 are generated independent of the outputs $C_3$–$C_6$. As seen from FIG. 10, the synchronized signal PCS necessarily has its pulse duration existing while the outputs $C_0$–$C_2$ of the stage counter change from 0 to 6. The incrementer controller is controlled by detecting the signal in the stages INTL, ADV and RPM.

In like manner, the stage CYL for detecting the synchronized reference signal PRS takes place when the outputs $C_0$–$C_2$ of the stage counter SC570 are 2. When the angular position sensor 98 delivers the reference pulse PR, it is necessary to deliver the synchronized reference signal PRS when the outputs $C_0$–$C_2$ are 2. This requirement is satisfied by the circuit shown in FIG. 9 since the circuit delivers the pulse signal whose pulse duration lasts from the stage signal STG0 to the stage signal STG7.

The stage VSP for detecting the vehicle speed takes place only when the outputs $C_0$–$C_2$ of the stage counter are 5. It is therefore only necessary to deliver the synchronized signal PSC while the outputs $C_0$–$C_2$ are 5. This requirement is also satisfied by the circuit shown in FIG. 9 since with the circuit the outputs $C_0$–$C_2$ have the values from 0 to 6. In the circuit shown in FIG. 9, the stage signals STG0 and STG7 may be replaced respectively by the stage signal STG4 delivered when the outputs $C_0$–$C_2$ have the value of 4 and the stage signal STG6 delivered when the outputs $C_0$–$C_2$ are 6. In this case, if the signal PS is received, the synchronized signal PSS is always delivered when the outputs $C_0$–$C_2$ are 4 and 5.

Now, the cycles of the stages will be referred to. As shown in the above given table 1, 128 stage signals are produced corresponding to the values 0–127 of the outputs $C_0$–$C_6$ of the stage counter SC570. When all these 128 stage signals have been generated, a major cycle is completed to be followed by a next major cycle. Each major cycle is constituted of 16 minor cycles and each minor cycle consists of 8 stage signals. The minor cycle corresponds to the values 0 to 7 of the outputs $C_0$–$C_2$ of the stage and is finished in 8 μsec.

To exactly synchronize the pulse signals PR, PC and PS and to exactly generate the synchronized pulses PRS, PCS and PSS, it is necessary for the outputs of the sensors to have a pulse duration longer than the period of the minor cycle. For example, the duration of the angular position pulse PC is shortened as the rotational speed of engine increases. It is about 9 μsec. for 9000 rpm. It is therefore necessary to make the period of the minor cycle shorter than 9 μsec. so as to exactly perform the synchronizing operation even at 9000 rpm. In this embodiment, the period of the minor cycle is chosen to be 8 μsec.

FIG. 11 shows in detail an example of the incrementor 478 shown in FIG. 4. The input terminals A0–A9 respectively receive the 10-bit data from one of the registers of the instantaneous register group, selected in accordance with the corresponding stage signal.

First, description will be made of the bit A0, i.e. signal received at the input terminal A0. The bit A0 and the count signal is supplied to the exclusive OR circuit 850. If the bit A0 is 0 (zero) and the count signal has the zero (L) level, then the signal 0 (zero) is delivered by the circuit 850. On the other hand, if the bit A0 is 1 and the count signal is the L level, the value 1 is delivered.

Namely, when the count signal is 0, the bit A0 is passed without any change.

If the count signal has the 1(H) level, the bit A0 is inverted; the output of the circuit 850 is 0 when the bit A0 is 1 and when the bit A0 is 0. With respect to the bit A0, the value is counted up by unity in accordance with the count signal. When the bit A0 and the level of the count signal are both 1, a carry signal is supplied to the processing gate 854 for the upper bit A1.

The NOR gate 852 serves to detect the above said carry signal and only when there is the carry signal, the bit A1 is inverted to be delivered as an output B1. When there is no carry signal, the output B1 is the same as the bit A1. In like manner, the NOR gates 856, 860, 864, 868, 872, 876, 880 and 884 detect the corresponding carry signals and the input bits A2–A9 are supplied, as inverted versions or without change, to the exclusive OR circuits 858, 862, 866, 870, 874, 878, 882 and 886. Namely, if there are the corresponding carry signals, the bits A2–A9 are inverted to form the outputs B2–B9, respectively. In the presence of the count signal, therefore, the input bits A0–A9 are each counted up by unity to produce the output signals B0–B9.

AND gates 890–908 serve as reset mechanisms. Upon reception of a reset signal, the outputs B0–B9 become all zero, irrespective of the outputs of the exclusive OR circuits 850–886. The count signal and the reset signal for controlling the incrementor whose detail is shown in FIG. 11 are generated by the incrementor controller 490 shown in FIG. 4.

FIGS. 12A and 12B show the details of the incrementor controller 490, FIG. 12A showing a circuit for generating the count signal COUNT and the reset signal RESET for controlling the incrementor 478 and FIG. 12B showing a circuit for generating a signal MOVE for transferring data to the output register groups 430 and 432. As described before, the incrementor has three functions: the first function is to increase the value of the input data by unity, the second is to reset the input data, and the third is to pass the input data without change. The increment function, i.e. the first function to increase the value of the input data by unity, is performed in response to the count signal COUNT and the reset function in response to the reset signal RESET. When the count signal is at the high level, the increment function is performed while the non-increment is performed when the count signal is at the low level. When the reset signal is at the high level, the reset function is carried out. The reset signal is given a preference over the count signal.

The various conditions are selected in response to the stage signals specified by the respective processings. The conditions refer to the synchronized external inputs and the outputs from the second comparison output register group 504. The condition for transferring data to the output register group 474 are the same as that for the control of the incrementor.

FIG. 13 illustrates a processing operation according to the fuel injection signal INJ. Since the time of starting the injection of fuel varies depending on the number of cylinder used, the initial angular position pulses INTLD derived from the reference signal PRS are counted by the register 442 serving as a CYL counter. The result of the counting is compared with the content of the CYL register 404 holding a value corresponding to the number of the cylinders. When the result of counting is greater than or equal to the content of the register 404, "1" is set in the CYL FF 506 of the first comparison output register group 502 and further in the CYLBF 508 of the second group 504. The CYL counter 442 is reset if the content of the CYLBF equals 1. Also, for CYLBF=1, the INJ timer 450 for measuring the fuel injection duration is reset. The content of the timer 450 is always increased unconditionally with time and compared with the content of the INJD register 412 holding the data corresponding to the fuel injection duration. When the content of the timer 450 is greater than or equal to the content of the register 412, "1" is set in the INJFF 522 of the first group 502 and further in the INJBF 524 of the second group 504. The unconditional increment with time is inhibited for INJBF=1. The inverted version of the content of the register INJBF is the fuel injection duration, i.e. the valve opening period of the fuel injector.

FIG. 14 illustrates a processing according to the signal for controlling the ignition. The register 452 serving as the ADV counter is reset by the initial angular position pulse INTLD. The content of the register 452 is increased while the synchronized angular position signal PC is at the high level. The increased content of the register 452 is compared with the content of the register ADV 414 holding the data corresponding to the ignition angle. If the former is greater than or equal to the latter, "1" is set in the register ADVFF 526 of the first group 502 and further in the register ADVBF 528 of the second group 504. The signal ADVD indicating the rising part of the output of the ADVBF resets the DWL counter 454 for instructing the start of condition. The content of the DWL counter 454 is increased while the synchronized angular position signal PC is at the high level, and then compared with the content of the DWL register 416 holding the data respresenting the angular position at which the electric conduction takes place, relative to the previous ignition angle. If the former is greater than or equal to the latter, "1" is set in the register DWLFF 530 of the first group 502 and further in the register DWLBF 532 of the second group 504. The output of the DWLBF 532 is the ignition control signal ING1.

FIG. 15 illustrates a processing according to the signal EGR(NIDL). The circuit elements 28 for controlling EGR, to which the signal EGR is supplied, employs a proportional solenoid and therefore the control of EGR is effected by controlling the duty cycles of the input signal. They are the EGRP register 418 for holding the period and the EGRD register 420 for holding the on-duration. The timer used in this processing is the EGR timer 456. During the processing in the stage EGRPSTG, the increment is unconditional. If the content of the EGR timer 456 proves to be greater or equal to the content of the EGRP register 418 as the result of comparison, "1" is set in the EGRPFF 534 of the first register group 502 and further in the EGRPBF 536 of the second register group 504.

During the processing in the stage EGRDSTG, the unconditional non-increment takes place and the EGR timer 456 is reset for EGRPBF=1. If, as a result of comparison, the content of the EGR timer 456 is greater than or equal to the content of the EGRD register 420, "1" is set in the EGRD register 538 of the first group 502 and further in the EGRD register 540 of the second group 504. The inversion of the output of the EGRD register 540 is the control signal EGR.

FIG. 16 illustrates the way of measuring the rotational speed of engine RPM (or vehicle speed VSP) and the processing of the measured results. The measurement is performed by determining a certain measurement duration by the RPMW timer 460 and also by counting the synchronized angular position pulses PC within the determined duration by the same counter.

The content of the RPMW timer 460 for measuring the measurement duration is increased unconditionally and reset when the content of the RPMWBF 552 is "1". If, as a result of comparison, the content of the RPMW timer 460 is greater than or equal to the content of the RPMW register 426, "1" is set in the RPMWFF 550.

In response to the signal RPMWD representing the rising part of the output signal of the RPMWBF 552, the content of the RPM counter 462 representing the result of the count of the pulses PC is transferred to the RPM register 430 of the output register group 474. The RPM counter 462 is reset when the content of the RPMWBF 552 is "1". The processing in the stage VSPSTG is similar to that described above.

The functions of the registers used in the embodiment of this invention will be particularized below in the following table 3.

TABLE 3

| No. of register | function of register |
|---|---|
| 402 (ZERO . REG) | to hold the digital value corresponding to zero and to transfer the value to the comparator when required. |
| 404 (CYL . REG) | to hold the data CYL representing the number of the used cylinders, the data CYL being used, for example, to produce a signal representing the rotation of the crank shaft through 360°. |
| 406 (INTL . REG) | to hold the data INTL representing the crank angle and the angle between a predetermined crank angular position and the angular position of the sensor for generating the reference signal INTLS. The reference signal PR from the sensor 98 is shifted by a predetermined value in accordance with the data INTL so as to correspond to the predetermined crank angular position. |
| 408 (INTV . REG) | to hold, as a timer, the data INTV representing the time to measure. If the data INTV is set in the register 408, an interruption signal can be delivered after the lapse of the time. |
| 410 (ENST . REG) | to hold the data ENST representing the time used to detect the accidental stopping of the engine. |
| 412 (INJD . REG) | to hold the data INJD representing the valve opening period of the fuel injector. |
| 414 (ADV . REG) | to hold the data ADV representing the crank angle range measured from the reference angle at which the reference signal is generated to the primary current cut-off angle of the ignition coil. |
| 416 (DWL . REG) | to hold the data DWL representing the crank angle range from the angle at which the immediately previous reference signal is generated to the angle at which the primary current is conducted through the ignition coil, in which range the primary current is kept cut off. |
| 418 (EGRP . REG) | to hold the data EGRP representing the pulse period of the pulse current signal EGR for controlling the aperture of the valve of the EGR apparatus. |
| 420 (EGRD . REG) | to hold the data EGRD representing the pulse duration of the pulse current signal EGR for controlling the aperture of the valve of the EGR apparatus. |
| 422 (NIDLP . REG) | to hold the data NIDLP representing the period of the pulse current signal NIDL for controlling the air regulator provided to control the flow of air through the bypass of the throttle chamber. |
| 424 (NIDLD . REG) | to hold the data NIDLD representing the pulse duration of the pulse current signal NIDL. |
| 426 (RPMW . REG) | to hold the data RPMW representing the constant period of time used to detect the rotational speed of the engine. |
| 428 (VSPW . REG) | to hold the data VSPW representing the constant period of time used to detect the vehicle speed. |
| 442 (CYLC . REG) | to hold the instantaneous number representing the number of arrivals of the reference signal pulses. |
| 444 (INTLC . REG) | to hold the number of the crank angle pulses delivered after the delivery of the reference pulse from the angular position sensor 98. |
| 446 (INTVT . REG) | to hold the instantaneous value of the variable which increases at regular intervals, e.g. every 1024 μsec, after the proper data has been set in the INTV register 408. |
| 448 (ENST . REG) | to hold the instantaneous value of the variable which increases at regular intervals, e.g. every 1024 μsec, after the reference pulse has been delivered from the angular position sensor 98. The content of the register 448 is reduced to zero upon reception of the reference pulse. |
| 450 (INJT . REG) | to hold the instantaneous value of the variable which increases at regular intervals, e.g. every 8 μsec, 16 μsec, 32 μsec, 64 μsec, 128 μsec or 256 μsec, after the CYL signal has been delivered. The above interval of time is chosen by the T register. |
| 452 (ADVC . REG) | to hold the instantaneous value of the variable which increases each time the angular position sensor 98 delivers the signal PC representing the rotation of a fixed crank angle, e.g. 0.5 degree, after the reference signal INTLS has been delivered. |
| 454 (DWLC . REG) | to hold the instantaneous value of the variable which increases each time the angular position sensor 98 delivers the crank angle position signal PC after the immediately previous signal INTLS has been delivered. |
| 456 (EGRT . REG) | to hold the instantaneous value of the variable which increases at regular intervals, e.g. every 256 μsec, after the signal EGRP has been delivered. |
| 458 (NIDLT . REG) | to hold the instantaneous value of the variable which increases at regular intervals, e.g. every 256 μsec, after the signal NIDLP has been delivered. |
| 460 (RPMWT . REG) | to hold the instantaneous value of the variable which increases at regular intervals of time after the second comparison result holding register 552 has delivered an output pulse. |
| 462 (RPMC . REG) | to hold the instantaneous value of the variable which increases each time the angular position sensor 98 delivers the angular position signal PC representing a fixed crank angle, after the second comparison result holding register 552 has delivered an output pulse. |
| 430 (RPM . REG) | to hold the data transferred from the register 462 in response to the output signal from the second comparison result holding register 552. The data is delivered onto the data bus in accordance with the address signal and the control instruction from the CPU 114. |
| 464 (VSPWT . REG) | to hold the instantaneous value of the variable which increases at regular intervals of time after the second comparison result holding register 556 has delivered an output. |
| 468 (VSPC . REG) | to hold the instantaneous values of the variable which increases each time one |

TABLE 3-continued

| No. of register | function of register |
|---|---|
| | of the pulses corresponding to the rotational speed of the wheel is generated, after the second comparison result holding register 556 has delivered an output pulse. |
| 432 (VSP . REG) | to hold the data transferred to the register 468 in response to the output signal of the second comparison holding register 556. The data is delivered onto the data bus in accordance with the address signal and the control instruction from the CPU 114. |
| 506 (CYLFF) | to have "1" set in if the data of the register 404 is less than or equal to the data of the register 442. |
| 508 (CYLBF) | to have the signal from the register 506 set in in timing with the clock signal $\phi 2$. |
| 510 (INTLFF) | to have "1" set in if the data of the register 406 is less than or equal to the data of the register 444. |
| 512 (INTLBF) | to have the signal from the register 510 set in in timing with the clock signal $\phi 2$. |
| 514 (INTVFF) | to have "1" set in if the data of the register 408 is less than or equal to the data of the register 446. |
| 516 (INTVBF) | to have the signal from the register 514 set in in timing with the clock signal $\phi 2$. |
| 518 (ENSTFF) | to have "1" set in if the data of the register 410 is less than or equal to the data of the register 448. |
| 520 (ENSTBF) | to have the signal from the register 518 set in in timing with the clock signal $\phi 2$. |
| 522 (INJFF) | to have "1" set in if the data of the register 412 is less than or equal to the data of the register 450. |
| 524 (INJBF) | to have the signal from the register 522 set in in timing with the clock signal $\phi 2$. |
| 526 (ADVFF) | to have "1" set in if the data of the register 414 is less than or equal to the data of the register 452. |
| 528 (ADVBF) | to have the signal from the register 526 set in in timing with the clock signal $\phi 2$. |
| 530 (DWLFF) | to have "1" set in if the data of the register 416 is less than or equal to the data of the register 454. |
| 532 (DWLBF) | to have the signal from the register 530 set in in timing with the clock signal $\phi 2$. |
| 534 (EGRPFF) | to have "1" set in if the data of the register 418 is less than or equal to the data of the register 456. |
| 536 (EGRPBF) | to have the signal from the register 534 set in in timing with the clock signal $\phi 2$. |
| 538 (EGRDFF) | to have "1" set in if the data of the register 420 is less than or equal to the data of the register 456. |
| 540 (EGRDBF) | to have the signal from the register 538 set in in timing with the clock signal $\phi 2$. |
| 542 (NIDLPFF) | to have "1" set in if the data of the register 422 is less than or equal to the data of the register 458. |
| 544 (NIDLPBF) | to have the signal from the register 542 set in in timing with the clock signal $\phi 2$. |
| 546 (NIDLDFF) | to have "1" set in if the data of the register 424 is less than or equal to the data of the register 458. |
| 548 (NIDLDBF) | to have the signal from the register 546 set in in timing with the clock signal $\phi 2$. |
| 550 (RPMWFF) | to have "1" set in if the data of the register 426 is less than or equal to the data of the register 460. |
| 552 (RPMWBF) | to have the signal from the register 550 set in in timing with the clock signal $\phi 2$. |
| 554 (VSPWFF) | to have "1" set in if the data of the register 428 is less than or equal to the data of the register 464. |
| 556 (VSPWBF) | to have the signal from the register 556 set in in timing with the clock signal $\phi 2$. |

Now, description will be made of how the reference data is set in the reference register group 470. The registers 402, 404, 406 and 410 have their data set at the time of starting the apparatus as the embodiment of this invention. The values of the data are never changed once they have been set in the registers. The setting of data in the register 408 is performed according to the programmed processing.

The register 412 receives the data INJD representing the value opening duration of the fuel injector 66. The data INJD is determined, for example, as follows. The output signal QA of the air-flow meter 14 is sent through the multiplexer 122 to the analog/digital converter 124. The digital data delivered from the A/D converter 124 is held in a register (not shown). The load data TP is obtained from the above data representing the quantity of sucked air and the data held in the register 430 shown in FIG. 4, through arithmetic operations or on the basis of the information stored in a map fashion. The outputs of the sensor 16 for the temperature of the sucked air, the sensor for the temperature of the cooling water and the sensor for the atmospheric pressure are converted to digital quantities, which are corrected according to the load data TP and the condition of the engine at operation. Let the factor of such a correction be $K_1$. The voltage of the battery is also converted to a digital quantity. The digital version of the battery voltage is also corrected according to the load data TP. Let the correction factor in this case be TS. Next, the correction by the $\lambda$ sensor 80 takes place and let the correction factor associated be $\alpha$. Therefore, the data INJD is given by the following expression.

$$INJD = \alpha(K_1 \cdot TP + TS)$$

Thus, the valve opening duration of the fuel injector is determined. The above method of determining the data INJD is merely an example and other methods may be employed.

The data ADV representing the ignition timing is set in the register 414. The data ADV is made up, for example, as follows. The map-like ignition data QIG with the data TP and the rotational speed as factors is held in the ROM 118. The data QIG is then subjected to starting correction, water temperature correction and acceleration correction. After these corrections, the data ADV is obtained.

The data DWL for controlling the charging period for the primary current through the ignition coil is set in the register 416. This data DWL is obtained through arithmetic operation from the data ADV and the digital value of the battery voltage.

The data EGRP representing the period of the signal EGR and the data NIDLP representing the period of the signal NIDL are set respectively in the registers 418 and 422. The data EGRP and NIDLP are predetermined.

The data EGRD representing the duration of opening the valve of the EGR (exhaust gas recurrent) apparatus is set in the register 420. As the duration increases, the aperture of the valve increases to increase the rate of recurrence of exhaust gas. The data EGRD is held in the ROM 118 in the form of, for example, a map-like data with the load data TP and the rotational speed as factors. The data is further corrected in accordance with the temperature of the cooling water.

The data NIDLD representing the duration of energizing the air regulator 48 is set in the register 424. The data NIDLD is determined, for example, as a feedback signal derived from such a feedback control that the rotational speed of the engine under no load condition always equals a preset fixed valve.

The data RPMW and VSPW representing fixed periods of time are set respectively in the registers 426 and 428 at the beginning of the operation of the apparatus.

In the foregoing description of the embodiment of this control apparatus, the output of the air-flow meter is used to control the amount of injected fuel, the advance of ignition angle and the recycle rate of exhaust gas. Any sensor other than the air-flow meter, however, may be employed to detect the condition of the sucked air. For example, a pressure sensor for detecting the pressure in the intake manifold may be used for that purpose.

As described above, according to this invention, the pulse signals received irregularly with respect to the stage cycle are synchronized so that exact detections can be assured.

Further, in the embodiment of this control apparatus described above, since the stage cycle is constituted of major cycles each of which consists of minor cycles, the detection cycle can be controlled in accordance with the precision required. Moreover, since the stages for detecting the synchronized signals are processed for a period in the order of a minor cycle, exact detections can be assured even when the engine is operating at a high speed.

Furthermore, the above described embodiment of this control apparatus has a reference register group, an instantaneous register group and a comparison result holding register group and a register is selected from each of the register groups and connected with the comparator in accordance with the outputs of the stage counter, so that so many control functions can be effected by a relatively simple circuit.

FIG. 17 shows an engine-stop detecting circuit, in which reference numeral 410 indicates an engine-stop time setting register (ENST register); 1602 a means for counting up every stage signal (hereafter referred to also as ENST counter for simplicity's sake) in accordance with the functions of the register 448 and the incrementor 478 shown in FIG. 4; 480 the comparator; 1604 an AND gate; and 1606 an OR gate. FIG. 18 is a time chart illustrating the operation of the circuit shown in FIG. 17.

As described above, the ENST register 410 stores the engine-stop detecting time TE defined by the processor consisting of the CPU 114, the ROM 118 and the RAM 116. The ENST counter 1602 is incremented each time the ENST stage signal in the table I given above takes place. This incrementing function may be considered equivalent to counting clock pulses (FIG. 18 at b) supplied at regular intervals through the AND gate 1604. The GO signal a supplied to the AND gate 1604 is delivered by the MODE register shown in FIG. 4. The MODE register, which is controlled by the CPU 114, has its $2^7$ bit allocated to the GO signal. The $2^7$ bit of the MODE register is used as a signal for permitting or inhibiting the operation of the control circuit 120 as a whole shown in FIG. 3. In this case, it is assumed that the operation of control circuit 120 is permitted when the $2^7$ bit is a "1".

The INTLD signal c, which is generated by the circuit shown in FIG. 4, is the initial crank angle pulse signal generated, for example, every 120° of the rotation in the case of a six-cylinder engine as shown in FIG. 20. The comparator 480 delivers the engine-stop detecting signal f when the contents of the ENST register coincides with those of the ENST counter.

As seen in the time chart in FIG. 18, the clock signal b is supplied to the ENST counter 1602 through the AND gate 1604 when the GO signal is at level "1" (actually, as described above, the contents e of the ENST register 448 are increased for every ENST stage signal under the control of the incrementor). If the INTLD signal c appears before the count value of the ENST counter 1602 reaches the preset value TE held in the ENST register 410, the counter 1602 is cleared by the clearing circuit 1606 shown in FIG. 17. Accordingly, the contents of the counter do not coincide with the contents of the ENST register 410 so that the comparator 480 does not deliver an output.

Now, let it be assumed that the INTLD signal c is not generated within the period TE held in the ENST register 410. Then the comparator 480 delivers the engine-stop detecting pulse signal f indicated at numeral 1 in FIG. 18. The engine-stop detecting pulse signal clears the ENST counter 1602 and is stored as a factor of an interrupt for the processor in the STATUS register as shown in FIG. 21. Namely, the engine-stop detecting pulse signal is applied to a predetermined bit of the STATUS register, for example the $2^3$ bit, thereby setting a "1" at the $2^3$ bit thereof.

FIG. 22 is a flow chart illustrating the processing of an interrupt. The flow starts with step 1 in which the content of the STATUS register is received to take in the interrupt factor. In step 2, the interrupt factor is examined. If the interrupt factor is the engine-stop detecting signal, the CPU 114 is immediately caused to deliver to the MODE register an output for turning off the GO signal (changing it's level from a "1" to a "0") in the MODE register in FIG. 19, in step 3. The change in state of the GO signal is immediately sent to the control circuit 120 shown in FIG. 3 to temporarily stop the operation of the control circuit. The circuit shown in FIG. 23 represents, for example, a path for conducting current to the ignition coil. Even if the ignition coil is drawing current, the turnoff of the GO signal stops the current conduction through the ignition coil so that the useless consumption of power by the ignition transistor and the accompanying generation of heat in the ignition circuit can be prevented.

FIG. 24 shows an example of a circuit component forming a part of the circuit shown in FIG. 4, in which reference numeral 1602 indicates the counter consisting of the register 448 and the incrementor 478; 410 the register and 480 the comparator. In response to the turnoff of the GO signal, the stage signal vanishes to stop the various stage processing functions. In other words, the supply of the count pulses to the counter 1602 is terminated. The pulse generator generates a pulse in response to the trailing edge of the GO signal as the transient from the ON to the OFF state, i.e. from level "1" to level "0". The generated pulse, which serves as a RESET signal, clears the counter and also resets the other control circuits. The circuit shown in FIG. 24 is used for, for example, the controls of fuel injection, ignition lead angle, the aperture of EGR valve and the rotational speed of idling engine.

Next, in step 4 in FIG. 22, the engine control programs in the processor are returned to their initial states. This actually means the following processing operations.

(1) The engine controls such as the fuel injection control and the ignition advance angle control programs may be in the interrupted state in response to an interrupt due to engine stoppage caused during their execution. And if the program is resumed without suitable checks, fuel injection and/or ignition may adversely take place before the engine starts.

(2) Since the operating modes and the input values (e.g. rotational speed etc.) assumed before the interrupt due to the engine stop are all useless, the contents of the memory must be returned to the states assumed before the turn-on of the starter switch.

In step 5 in FIG. 22, the initial values for the restarting of the engine after stopping are calculated by the CPU 114 and set in the reference register group 470 shown in FIG. 4. Namely, in step 5 of the flow chart in FIG. 22, the control circuits in FIG. 3 are all returned to the states assumed before the start of the engine and therefore the risk that engine control is performed on the basis of erroneous data established before stopping of the engine is eliminated. By turning on the GO signal in the MODE register in step 6, namely by setting a "1" at the $2^7$ bit of the MODE resister, the stage cycle is started and the control circuits resume their normal operations.

FIGS. 25 and 26 are for the detailed description of the operation of the circuit shown in FIG. 17, illustrating a processing operation (ENST processing operation) for generating an engine-stop interrupt signal indicating that the engine has nearly stopped. The ENSTREG 448 serving as the ENST TIMER is reset by the INTLDR signal obtained by synchronizing the initial angle pulse INTLD with the ENSTSTG (also reset by ENSTBF when the engine-stop interrupt signal is generated) and the contents of the register 448 are unconditionally increased by an ENST STG signal. The contents of the register 448 are then compared with the contents of the ENST REG 410 for holding the period of the pulse INTLD for judging that the engine has nearly stopped. If the former is "greater than" or "equal to" the latter, a "1" is set in the ENST FF 518 in the first register group 502 and a "1" is set in the ENST BF 520 in the second register group 504. The signal ENSTD indicating the leading edge of the signal to the ENST BF is set in the STATUS register shown in FIG. 4, to deliver an interrupt signal IRQ. INTLDR shown in FIG. 25 is the signal generated by the circuit shown in FIG. 26. FIG. 27 is the time chart of the operation of this circuit. Thus, the signal INTLDR is generated by the use of a set/reset flip-flop SRFF, latch circuit L1 and L2, and gate circuits.

The above interrupt signal ENSTD is generated when the period of the signal INTLD exceeds a preset time (the content of ENST REG times the period of ENST STG). Since the period of INTLD varies inversely with the rotational speed of the engine, it serves not only as a signal for judging that the engine has nearly stopped, but also as a signal for judging whether or not the engine has reached a preset rpm if the preset time is appropriately chosen.

According to this invention, when the rotational speed of the engine falls low and when the period of the signal INTLD exceeds a time for giving the basis of the judgement that the engine has nearly stopped, an interrupt signal is generated so that stopping of the engine can be detected within a very short time. Moreover, by using such an interrupt signal, task processing operations during engine stoppage such as, for example, the stopping of the fuel pump and the blockings of various signals (fuel injector driving signal INJ, ignition coil current conduction signal IGN etc.) can be executed so that an electronic engine control with high reliability can be realized. As a result, there is obtained an advantage that the useless supply of fuel to the engine and the wasteful conduction of current through the ignition coil during engine stoppage can be prevented. Further, since the conditions of the processor and the control circuit as a whole are returned to the initial values when the engine is stopped, unsuitable controls due to the use of erroneous data immediately before the engine stops can be prevented and therefore engine safety is very much improved.

What we claim is:

1. For use in a processor-controlled apparatus for controlling the operation of an internal combustion engine for which sensor means produce signals representative of operating conditions of said engine, and being coupled to actuator means for controlling respective energy conversion functions of said engine in response to control signals applied thereto, a control apparatus comprising, in combination:

first means for generating an engine control timing signal pattern through which operational events of said engine are controlled;

second means for storing a plurality of engine control codes supplied thereto by said processor;

third means, coupled to said first means, for generating respective engine timing codes the values of which are selectively modified by said engine control timing pattern;

fourth means, coupled to said second and third means, for comparing respective ones of said engine control codes with respective ones of said engine timing codes and producing respective output signals when said respective engine control codes define a prescribed relationship with respect to said engine timing codes; and fifth means, coupled to said fourth means, for producing control signals to be coupled to said actuator means in response to the output signals produced by said fourth means; and wherein one of said engine control codes as supplied to said second means by said processor is representative of a prescribed rate of rotation of the engine crankshaft; and wherein said control apparatus further comprises sixth means, responsive to an output signal produced by said fourth means in response to a respective enging timing code generated by said third means defining said prescribed relationship with respect to said one engine control code, for preventing said fifth means from coupling control signals to said actuator means.

2. A control apparatus according to claim 1, wherein said sixth means includes means for preventing engine timing codes generated by said third means for being modified by said engine control timing pattern.

3. A control apparatus according to claim 2, wherein said sixth means further includes means, responsive to an output signal produced by said fourth means, for producing a prescribed interrupt signal to be selectively coupled to said processor, and means, adapted to be coupled to said processor, for storing prescribed data, coupled thereto from said processor in response to said interrupt signal, in accordance with which engine time codes generated by said third means are prevented from being modified by said engine control timing pattern.

4. A control apparatus according to claim 3, wherein said control apparatus further includes seventh means, responsive to said prescribed data, for causing the values of the engine timing codes generated by said third means to be set at preselected valves.

5. A control apparatus according to claim 4, wherein said sensor means include rotation sensor means for generating an output pulse in response to the rotation of the engine crankshaft through a predetermined angle of rotation, a second of said engine control codes is representative of a prescribed angle of rotation of the engine crankshaft, relative to a preselected rotational position of said crankshaft, for which said rotation sensor means produces an output pulse, and said control apparatus further includes eighth means, responsive to an output signal produced by said fourth means in response to a respective engine timing code generated by said third means defining said prescribed relationship with respect to said second engine control code, for causing the value of the engine timing code associated with said one engine control code to be set at a prescribed value.

6. A control apparatus according to claim 5, wherein said eighth means includes means for synchronizing the setting of the value of the engine timing code associated with said one engine control code at said prescribed value with the signals of said engine control timing signal pattern by way of which the engine timing code associated with said one engine control code is modified.

7. A control apparatus according to claim 3, wherein the values of the respective engine control codes are set at code values for restarting the engine by said processor in response to said interrupt signal.

8. A control apparatus according to claim 1, wherein said prescribed rate of rotation of the engine crankshaft corresponds to a condition indicative of the stopping of the engine.

9. A control apparatus according to claim 1, wherein said sixth means includes means, responsive to said output signal produced by said fourth means, for producing a prescribed interrupt signal to be selectively coupled to said processor, and means, adapted to be coupled to said processor, for storing prescribed data coupled thereto from said processor in response to said interrupt signal in accordance with which said fifth means is prevented from coupling control signals to said actuator means.

10. A control apparatus according to claim 1, wherein said control apparatus further includes seventh means, responsive to said sixth means preventing said fifth means from coupling signals to said actuator means, for causing the values of the engine timing codes generated by said third means to be set at preselected values.

11. A control apparatus according to claim 1, wherein said sensor means include rotation sensor means for generating an output pulse in response to the rotation of the engine crankshaft through a predetermined angle of rotation, a second of said engine control codes is representative of a prescribed angle of rotation of said engine crankshaft, relative to a preselected rotational position of said crankshaft, for which said rotation sensor means produces an output pulse, and said control apparatus further includes seventh means, responsive to an output signal produced by said fourth means in response to a respective engine timing code generated by said third means defining said prescribed relationship with respect to said second engine control code, for causing the value of the engine timing code associated with said one engine control code to be set at a prescribed value.

12. A control apparatus according to claim 1, wherein the values of said respective engine control codes are set at code values for restarting the engine in response to an output of said sixth means.

13. A control apparatus according to claim 1, wherein said second means comprises a first plurality of registers for storing respective engine control codes, and said third means includes a second plurality of registers for storing respective engine timing codes, and means, coupled to said second plurality of registers, for controllably modifying the engine timing codes in accordance with the signals of said engine control timing signal pattern.

14. A control apparatus according to claim 13, wherein said controllably modifying means comprises means for selectively incrementing the data value of a respective engine timing code by a prescribed value in response to receipt of a respective portion of said engine control timing signal pattern that is associated with that engine timing code.

15. A control apparatus according to claim 14, wherein said incrementing means comprises means for temporarily storing the engine timing code stored by each respective one of said second plurality of registers, and means for receiving the engine timing code from said temporarily storing means and selectively incrementing the data value of said code and causing the engine timing code stored in said respective one of said secone plurality of registers to be replaced by said code the data value of which has been selectively incremented.

16. A control apparatus according to claim 14, wherein said incrementing means comprises means for reading out the engine timing code stored by each respective one of said second plurality of registers and temporarily storing said read-out engine timing code during a first interval of time, and means for receiving the engine timing code from said temporarily storing means and selectively incrementing the data value of said code and causing the engine timing code stored in said respective one of said second plurality of register to be replaced by said code the data value of which has been selectively incremented during a second interval of time subsequent to said first interval of time.

17. A control apparatus according to claim 13, wherein said fifth means includes a first plurality of storage means for selectively storing the respective output signals produced by said fourth means; and a second plurality of storage means, coupled to the respective ones of said first plurality of storage means, for receiving and storing the output signals stored by said first plurality of storage means.

18. A control apparatus according to claim 17, wherein said controllably modifying means includes means, coupled to said fifth means, for controllably modifying the engine timing codes stored in said second plurality of registers in dependence upon the output signals stored said second plurality of storage means.

19. A control apparatus according to claim 13, wherein said controllably modifying means includes means, coupled to said fifth means, for controllably modifying the engine timing codes stored in said second plurality of registers in dependence upon the output signals stored said second plurality of storage means.

20. A control apparatus according to claim 13, wherein said control apparatus further includes seventh means, responsive to said sixth means preventing said fifth means from coupling control signals to said actuator means, for causing the values of engine timing codes stored by said second plurality of registers to be set at preselected values.

21. A control apparatus according to claim 13, wherein said sensor means include rotation sensor means for generating an output pulse in response to the rotation of the engine crankshaft, relative to a preselected rotational position of said crankshaft, for which said rotation sensor means produces an output pulse, and said control apparatus further includes seventh means, responsive to an output signal produced by said fourth means in response to a respective engine timing code stored by one of said second plurality of registers defining said prescribed relationship with respect to said second engine control code, for causing the value of the engine timing code associated with said one engine control code to be set at a prescribed value.

22. A control apparatus according to claim 13, wherein said sixth means further includes means, responsive to said output signal produced by said fourth means, for producing a prescribed interrupt signal to be selectively coupled to said processor, and means adapted to be coupled to said processor, for storing prescribed data, coupled thereto from said processor in response to said interrupt signal, in accordance with which engine time codes stored by said second plurality of registers are prevented from being modified by said engine control timing pattern.

23. A control apparatus according to claim 22, wherein said control apparatus further includes seventh means, responsive to said prescribed data, for causing the values of the engine timing codes stored by said second plurality of registers to be set at preselected values.

24. A control apparatus according to claim 23, wherein said sensor means include rotation sensor means for generating an output pulse in response to the rotation of the engine crankshaft through a predetermined angle of rotation, a second of said engine control codes stored by a register of first plurality of registers is representative of a prescribed angle of rotation of the engine crankshaft, relative to a preselected rotational position of said crankshaft, for which said rotation sensor means produces an output pulse, and said control apparatus further includes eighth means, responsive to an output signal produced by said fourth means in response to a respective engine timing code generated by said third means defining said prescribed relationship with respect to said second engine control code, for causing the value of the engine timing code associated with said one engine control code to be set at a prescribed value.

25. A control apparatus according to claim 24, wherein said eighth means includes means for synchronizing the setting of the value of the engine timing code associated with said one engine control code at said prescribed value with the signals of said engine control timing signal pattern by way of which the engine timing code associated with said one engine control code is modified.

26. For use in a processor-controlled apparatus for controlling the operations of an internal combustion engine for which a plurality of sensors detect operating conditions of the engine, and being coupled to actuators for controlling respective energy conversion functions of said engine, a control apparatus for generating pulses for driving said actuators in accordance with the engine control data generated by said processor, said actuators controlling the energy conversion functions of said engine in accordance with the pulses delivered from said control apparatus, comprising, in combination:

first and second registers for storing respective data corresponding to fuel injection and ignition;

a first counter for counting first pulses generated at regular intervals;

a second counter for counting second pulses generated in timing with the rotation of said engine;

comparing means for comparing the contents of said first and second registers with the contents of said first and second counters and outputting first and second output signals representative of the results of comparison, respectively;

first and second storage means for storing said first and second output signals;

a set signal generator for generating set signals for coupling said first and second output signals to said first and second storage means respectively, said actuators being controlled in accordance with the contents of said first and second storage means;

means for producing sequential timing pulses;

means for storing a count whose value is successively modified by said sequential timing pulses;

means for loading and storing a selected reference value supplied thereto by said processor;

means for detecting stopping of the engine in response to the value of said count reaching said selected reference value as supplied by said processor; and means for inhibiting said set signal generator from coupling said set signals to said storage means in response to the detection of the stopping of the engine by the engine stopping detecting means.

27. A control apparatus according to claim 26, wherein said inhibiting means inhibits the application of said first and second pulses to said first and second counters, in response to the detection of stopping of the engine.

28. A control apparatus according to claim 27, wherein said inhibiting means includes first and second inhibit circuits for inhibiting the application of said first and second pulses to said first and second counters in response to the detection of stopping of the engine, respectively.

29. A control apparatus according to claim 27, wherein said inhibiting means includes a mode register for inhibiting said set signal and said first and second output signals from being coupled to said storage means and said first and second counters, respectively, in response to first prescribed data supplied from said processor, and for enabling said set signal and said first and second output signals to be coupled to said storage means and said first and second counters, respectively, in response to second prescribed data supplied from said processor, said processor delivering said first prescribed data to said mode register in response to the detection of stopping of the engine by said engine stopping detecting means.

30. A control apparatus as claimed in claim 29, wherein said processor returns its data processing operations to their initial states after the supply of said first prescribed data to said mode register.

31. A control apparatus according to claim, 30, wherein said processor supplies said second prescribed data to said mode register after the returning said data processing operations to said initial states.

32. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals coupled thereto, and being coupled to receive signals of said engine, produced by a plurality of sensors indicative of operating conditions of the engine, said sensors including at least an angle sensor for producing an output signal in response to a predetermined angle of rotation of the crankshaft, a control apparatus comprising, in combination:

- first means for producing output signals at predetermined time intervals;
- second means for counting the output signals produced by said first means;
- third means for loading and storing a selectable reference count value supplied thereto by said processor;
- fourth means for producing an output dependent upon a selectable degree of rotation of the crankshaft relative to its position at which an output is produced by said angle sensor;
- fifth means, coupled to said fourth means, for returning the count total of said second means to its initial value in response to the output of said fourth means;
- sixth means for supplying an output to be coupled to said processor means in response to the counted value of said second means reaching said selectable reference count stored by said third means value; and
- seventh means, adapted to be coupled to receive data from said processor means in accordance with the output of the sixth means, and preventing control signals from being delivered to said ignition means.

33. A control apparatus according to claim 32, wherein said fifth means is further coupled with said processor for further returning the count total of said second means to its initial value in response to the output of the processor.

34. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals applied thereto, and being coupled to receive signals produced by a plurality of sensors indicative of operating conditions of the engine, said sensors including at least an angle sensor for producing an output signal in response to a predetermined angle of rotation of the output crankshaft, a control apparatus comprising, in combination:

- first means for producing a respective first or a second signal in accordance with data coupled thereto from said processor;
- second means for producing signals of a predetermined time interval in response to said first signal produced by said first means and terminating said signals in response to said second signal produced by said first means;
- third means for counting the output signals produced by said second means,
- fourth means for loading and storing a selectable reference count value supplied thereto by said processor;
- fifth means for producing an output dependent upon a selectable degree of rotation of said output crankshaft relative to its position at which an output is produced by said angle sensor;
- sixth means for resetting the counted total of said third means to its initial value in response to the output of said fifth means;
- seventh means for delivering an output to the processor when the counted value of said third means reaches said selectable reference count stored by said fourth means and
- eighth means adapted to be coupled to receive data produced by the processor in accordance with the output of the seventh means, said eighth means preventing control signals from being delivered to said ignition means.

35. A control apparatus according to claim 34, wherein said sixth means is further adapted to be coupled with said processor to return the count total of said third means to its initial value in accordance with the output of the processor.

36. A method of operating a processor-controlled apparatus for controlling the operation of a combustion engine, said engine including an output crankshaft driven by mechanical energy converted from heat energy caused by the combustion of a fuel, and at least ignition means for controlling energy conversion, in response to control signals applied thereto, and being coupled to receive signals produced by a plurality of sensors indicative of operating conditions of the engine, said sensors including an angle sensor for producing an output in accordance with a predetermined angle of rotation of the output crankshaft of the engine, said apparatus including input/output means adapted to receive sensed signals from said sensors and to deliver control signals to said energy conversion controlling means;

the method comprising the steps of:

(a) loading, in reference storage means, a selectable reference count value;

(b) producing a signal at predetermined time intervals;

(c) advancing a count in response to said signals;
(d) restarting said count in response to the output of the angle sensor;
(e) continuously repeating the sequence of steps (b) through (d);
(f) producing a signal when the count total reaches said selectable count value; and
(g) preventing control signals from being delivered from the input/output means to said ignition means in response to the signal produced in step (f).

37. A method according to claim 36, wherein said method further includes the step of
(h) returning the count value to its initial value in response to the signal produced by step (f).

38. A method according to claim 37, wherein said method further includes the step of
(i) storing a first and a second signal to control the count; and
(j) strating the count in accordance with the first signal stored in step (i) and for stopping the count in accordance with the second signal stored in step (i).

39. A method according to claim 36, wherein said method further includes the steps of
(h) storing a first and a second signal to control the count; and
(i) starting the count in accordance with the first signal stored in step (h), and stopping the count in accordance with the second signal stored in step (h).

40. A method of operating a processor-controlled apparatus for controlling the operation of a combustion engine, said engine including an output crankshaft driven by mechanical energy converted from heat energy caused by the combustion of a fuel, and at least one means controlling energy conversion in response to control signals applied thereto, and being coupled to receive signals produced by a plurality of sensors indicative of operating conditions of the engine, said sensors including an angle sensor for producing an output signal in accordance with a predetermined rotation of the output crankshaft of the engine, said apparatus including input/output means adapted to receive sensed signals from said sensors and to deliver control signals to said energy conversion controlling means;
the method comprising the steps of:
(a) loading, in reference storage means, a selectable count value;
(b) producing signals at predetermined time intervals;
(c) advancing a count in response to said signals;
(d) returning the count value to an initial value in response to an output of the angle sensor;
(e) continuously repeating the sequence of steps (b) through (d);
(f) producing a signal when the count total reaches said selectable count value; and
(g) returning engine control data processing operations to their initial states in response to the signal produced by step (f).

41. A method according to claim 40, wherein said method further includes the step of
(g) setting initial control signal values into the input/output means after execution of step (f).

42. A method according to claim 41, wherein said method further includes the step of
(i) preventing control signals from being delivered from said input/output means to said energy conversion control means in response to the signal produced by step (f).

43. A method according to claim 40, wherein said method further includes the step of
(h) preventing control signals from being delivered from said input/output means to said energy conversion control means, in response to the signal produced by step (f).

44. For use in a processor-controlled apparatus for controlling the operation of an internal combustion engine, having an output crankshaft, for which sensor means produce signals representative of operating conditions of said engine, said sensor means including an angle sensor for producing an output signal in response to a predetermined angle of rotation of the output crankshaft, and being coupled to actuator means for controlling respective energy conversion functions of said engine in response to control signals applied thereto, a control apparatus comprising, in combination:
first means for generating an engine control timing signal pattern through which operational events of said engine are controlled;
second means for storing a plurality of engine control codes;
third means, coupled to said first means, for generating respective engine timing codes the values of which are selectively modified by said engine control timing pattern;
fourth means, coupled to said second and third means, for comparing respective ones of said engine control codes with respective ones of said engine timing codes and producing respective output signals when said respective engine control codes define a prescribed relationship with respect to said engine timing codes; and
fifth means, coupled to said fourth means, for producing control signals to be coupled to said actuator means in response to the output signals produced by said fourth means; and wherein
one of said engine control codes is representative of a prescribed rate of rotation of the engine crankshaft, and a second of said engine control codes is representative of a prescribed degree of rotation of said crankshaft relative to its position at which said angle sensor produces an output; and wherein said control apparatus further comprises
sixth means, responsive to an output signal produced by said fourth means in response to a respective engine timing code generated by said third means defining said prescribed relationship with respect to said one engine control code, for preventing said fifth means from coupling control signals to said actuator means; and
seventh means, responsive to an output signal produced by said fourth means in response to a respective engine timing code generated by said third means defining said prescribed relationship with respect to said second engine control code, for preventing the respective engine timing code generated by said third means that is associated with said one engine control code from defining said prescribed relationship with respect to said one engine control code.

45. For use in a processor-controlled apparatus for controlling the operations of an internal combustion engine, having an output crankshaft, for which a plurality of sensors detect operating conditions of the engine, said sensors including an angle sensor for producing an output pulse in response to a predetermined angle of rotation of the crankshaft, and being coupled to actuators for controlling respective energy conversion functions of said engine, a control apparatus for generating pulses for driving said actuators in accordance with the engine control data generated by said processor, said actuators controlling the energy conversion functions of said engine in accordance with the pulses delivered from said control apparatus, comprising, in combination:

first and second registers for storing respective data corresponding to fuel injection and ignition;

a first counter for counting first pulses generated at regular intervals;

a second counter for counting second pulses generated in timing with the rotation of said engine;

comparing means for comparing the contents of said first and second registers with the contents of said first and second counters and outputting first and second output signals representative of the results of comparison, respectively;

first and second storage means for storing said first and second output signals;

a set signal generator for generating set signals for coupling said first and second output signals to said first and second storage means respectively, said actuators being controlled in accordance with the contents of said first and second storage means;

means for detecting stopping of the engine;

means for inhibiting said set signal generator from coupling said set signals to said storage means in response to the detection of the stopping of the engine by the engine stopping detecting means; and means for producing an output dependent upon a selectable degree of rotation of the crankshaft relative to its position at which an output is produced by said angle sensor, and thereby preventing said detecting means for detecting the stopping of the engine.

46. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals coupled thereto, and being coupled to receive signals of said engine, produced by a plurality of sensors indicative of operating conditions of the engine, said sensors including at least an angle sensor for producing an output signal in response to a predetermined angle of rotation of the crankshaft, a control apparatus comprising, in combination:

first means for producing output signals at predetermined time intervals;

second means for counting the output signals produced by said first means;

third means for producing an output dependent upon a selectable degree of rotation of the crankshaft relative to its position at which an output is produced by said angle sensor;

fourth means, coupled to said third means, for returning the count total of said second means to its initial value in response to the output of said third means;

fifth means for supplying an output to be coupled to said processor in response to the counted value of said second means reaching a predetermined value; and sixth means, adapted to be coupled to receive data from said processor means in accordance with the output of the fifth means, and preventing control signals from being delivered to said ignition means.

47. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals applied thereto, and being coupled to receive signals produced by a plurality of sensors indicative of operating conditions of the engine, said sensors including at least an angle sensor for producing an output signal in response to a predetermined angle of rotation of the output crankshaft, a control apparatus comprising, in combination:

first means for producing a respective first or a second signal in accordance with data coupled thereto from said processor;

second means for producing signals of a predetermined time interval in response to said first signal produced by said first means and terminating said signals in response to said second signal produced by said first means;

third means for counting the output signals produced by said second means;

fourth means for producing an output dependent upon a selectable degree of rotation of said output crankshaft relative to its position at which an output is produced by said angle sensor;

fifth means for resetting the counted total of said third means to its initial value in response to the output of said fourth means;

sixth means for delivering an output to the processor when the counted value of said third means reaches a predetermined value; and seventh means adapted to be coupled to receive data produced by the processor in accordance with the output of the sixth means, said seventh means preventing control signals from being delivered to said ignition means.

48. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals coupled thereto, and being coupled to receive signals of said engine, produced by a plurality of sensors indicative of operating conditions of the engine, said sensors including at least an angle sensor for producing an output signal in response to a predetermined angle of rotation of the crankshaft, a control apparatus comprising, in combination:

first means for producing output signals at predetermined time intervals;

second means for counting the output signals produced by said first means;

third means for loading and storing a selectable reference count supplied thereto by said processor;

fourth means for returning the count total of said second means to its initial value in response to the output of said angle sensor;

fifth means for supplying an output to be coupled to said processor means in response to the counted value of said second means reaching said selectable reference count stored by said third means; and sixth means, adapted to be coupled to receive data from said processor in accordance with the output of the fifth means, and preventing control signals from being delivered to said ignition means.

49. For use in a processor-controlled apparatus for controlling the operation of a combustion engine having an output crankshaft driven by mechanical energy converted from heat energy which is released by the combustion of fuel, said engine including at least ignition means for controlling the ignition timing of said engine, in response to control signals applied thereto, and being coupled to receive signals produced by a plurality of sensors indicative of operating conditions of the engine, said sensors including at least an angle sensor for producing an output signal in response to a predetermined angle of rotation of the output crankshaft, a control apparatus comprising, in combination:

first means for producing a respective first or a second signal in accordance with data coupled thereto from said processor;

second means for producing signals of a predetermined time interval in response to said first signal produced by said first means and terminating said signals in response to said second signal produced by said first means;

third means for counting the output signals produced by said second means;

fourth means for loading and storing a selectable reference count value supplied thereto by said processor;

fifth means for resetting the counted total of said third means to its initial value in response to the output of said sensor;

sixth means for delivering an output to the processor when the counted value of said third means reaches said selectable reference count stored by said fourth means; and seventh means adapted to be coupled to receive data produced by the processor in accordance with the output of the sixth means, said seventh means preventing control signals from being delivered to said ignition means.

* * * * *